US010812385B2

(12) United States Patent
Litzinger

(10) Patent No.: US 10,812,385 B2
(45) Date of Patent: Oct. 20, 2020

(54) USER-DRIVEN NETWORK TRAFFIC SHAPING

(71) Applicant: HITACHI, LTD., Tokyo (JP)

(72) Inventor: Brian E. Litzinger, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 21 days.

(21) Appl. No.: 16/324,129

(22) PCT Filed: Jan. 26, 2017

(86) PCT No.: PCT/US2017/015073
§ 371 (c)(1),
(2) Date: Feb. 8, 2019

(87) PCT Pub. No.: WO2018/140018
PCT Pub. Date: Aug. 2, 2018

(65) Prior Publication Data
US 2019/0190830 A1 Jun. 20, 2019

(51) Int. Cl.
*H04L 12/801* (2013.01)
*H04L 12/815* (2013.01)
(Continued)

(52) U.S. Cl.
CPC .............. *H04L 47/11* (2013.01); *H04L 47/22* (2013.01); *H04L 47/2433* (2013.01); *H04L 47/825* (2013.01)

(58) Field of Classification Search
CPC ..... H04L 12/26; H04L 12/801; H04L 12/815; H04L 12/851; H04L 12/911; H04L 47/00; H04L 47/10; H04L 47/11; H04L 47/20; H04L 47/22; H04L 47/24; H04L 47/825; H04L 47/2433
See application file for complete search history.

(56) References Cited

U.S. PATENT DOCUMENTS 7,808,918 B2 * 10/2010 Bugenhagen ........... H04L 47/22
  370/229
8,233,448 B2 *  7/2012 Satapathy ............... H04L 47/14
  370/229
(Continued)

OTHER PUBLICATIONS

International Search Report of PCT/US2017/015073 dated Apr. 10, 2017.

*Primary Examiner* — Tri H Phan
(74) *Attorney, Agent, or Firm* — Mattingly & Malur, PC

(57) ABSTRACT

Some examples include performing traffic shaping for a network. For instance, a system may detect congestion in the network and may determine at least two traffic flows contributing to the congestion. The system may provide a user interface that includes information related to first and second traffic flows determined to be main contributors to the congestion from among the traffic flows contributing to the congestion. The system may receive, via the user interface, a selection of one of the first traffic flow or the second traffic flow as an indication of a user selection of one of the traffic flows as having a higher priority than at least another one of the traffic flows. Based on the indication, the system may send packets of the selected traffic flow according to the higher priority and send packets of the at least one other traffic flow according to a lower priority.

20 Claims, 17 Drawing Sheets

(51) Int. Cl.
    *H04L 12/851*    (2013.01)
    *H04L 12/911*    (2013.01)

(56) References Cited

U.S. PATENT DOCUMENTS

| | | | |
|---|---|---|---|
| 8,369,238 B2* | 2/2013 | Xu | H04L 47/2433 |
| | | | 370/252 |
| 9,059,921 B2* | 6/2015 | Xu | H04L 41/5022 |
| 9,143,976 B2* | 9/2015 | Raleigh | H04L 12/14 |
| 9,237,106 B2* | 1/2016 | Ovsiannikov | H04L 47/2441 |
| 9,557,889 B2* | 1/2017 | Raleigh | G06F 3/0482 |
| 9,722,906 B2* | 8/2017 | Vasseur | H04L 43/12 |
| 9,722,929 B2* | 8/2017 | Miklos | H04L 5/006 |
| 10,735,324 B2* | 8/2020 | Torres | H04L 47/24 |
| 2008/0049615 A1 | 2/2008 | Bugenhagen | |
| 2011/0044262 A1 | 2/2011 | Satapathy et al. | |
| 2011/0305147 A1* | 12/2011 | Xu | H04L 47/2433 |
| | | | 370/252 |
| 2012/0230345 A1 | 9/2012 | Ovsiannikov | |
| 2013/0077486 A1 | 3/2013 | Keith | |
| 2013/0132854 A1 | 5/2013 | Raleigh et al. | |
| 2014/0093231 A1* | 4/2014 | Fisher | H04B 10/03 |
| | | | 398/2 |
| 2015/0023168 A1 | 1/2015 | Kotecha et al. | |
| 2016/0218951 A1 | 7/2016 | Vasseur et al. | |
| 2017/0026291 A1 | 1/2017 | Smith et al. | |

* cited by examiner

| Simple Weightings A vs. B ||
|---|---|
| Selections | Weighting |
| FT1 +++- | 2 |
| FT2 - | -1 |
| FT3 - | -1 |
| FT4 ++- | 1 |
| FT5 - | -1 |
| FT6 + | 1 |
| FT7 + | 1 |
| FT8 -- | -2 |

| Ordered Relative Weightings |||
|---|---|---|
| Selections | Weighting | Flow Type Description |
| FT1 +++- | 2 | NETFLIX® on mainTV |
| FT4 ++- | 1 | HULU® on bedroomTV |
| FT6 + | 1 | Parent's teleconference |
| FT7 + | 1 | VoIP Call |
| FT2 - | -1 | ITUNES® download on daughter's phone |
| FT3 - | -1 | OS upgrade on son's laptop |
| FT5 - | -1 | BITTORRENT® download |
| FT8 -- | -2 | Child's online realtime game |

FIG. 5

USER-DRIVEN NETWORK TRAFFIC SHAPING

TECHNICAL FIELD

This disclosure relates to the technical field of network communications.

BACKGROUND

Residences, businesses, organizations, and other entities have an ever-increasing number of devices and users on their networks. Further, the number of devices accessing networks is expected to explode as the Internet of Things (IoT) becomes widely adopted. Increasingly users find themselves in congested network environments in which other devices and users are competing with them for limited available bandwidth. While traffic shaping techniques may be able to improve the network availability and user interactions with Internet-based services, conventional traffic shaping may be too complicated for the average user. Furthermore, net neutrality laws in some jurisdictions may prevent Internet Service Providers (ISPs) from providing traffic shaping services.

As one example, US Patent Application Publication No US2015/0023168 to Kotecha et al. describes that a traffic identification device may identify congestion-causing traffic flows using dynamic traffic analysis, and a traffic configuration device may determine configuration adjustments to alleviate a congestion condition associated with a whole or a part of a network. However, Kotecha does not contemplate enabling users to provide inputs or otherwise control traffic shaping on a network.

SUMMARY

Some implementations include performing traffic shaping in a network, such as for controlling congestion. For instance, a system may detect congestion in the network and may determine at least two traffic flows contributing to the congestion. The system may provide a user interface that includes information related to a first traffic flow and a second traffic flow determined to be the main contributors to the congestion from among the at least two traffic flows contributing to the congestion. The system may receive, via the user interface, a selection of one of the first traffic flow or the second traffic flow as an indication of a user selection of one of the traffic flows as having a higher priority than at least another one of the traffic flows. Based on the indication, the system may send packets of the selected traffic flow according to the higher priority and send packets of the at least one other traffic flow according to a lower priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates example data structures including user selections according to some implementations.

DESCRIPTION OF THE EMBODIMENTS

Figure 1:
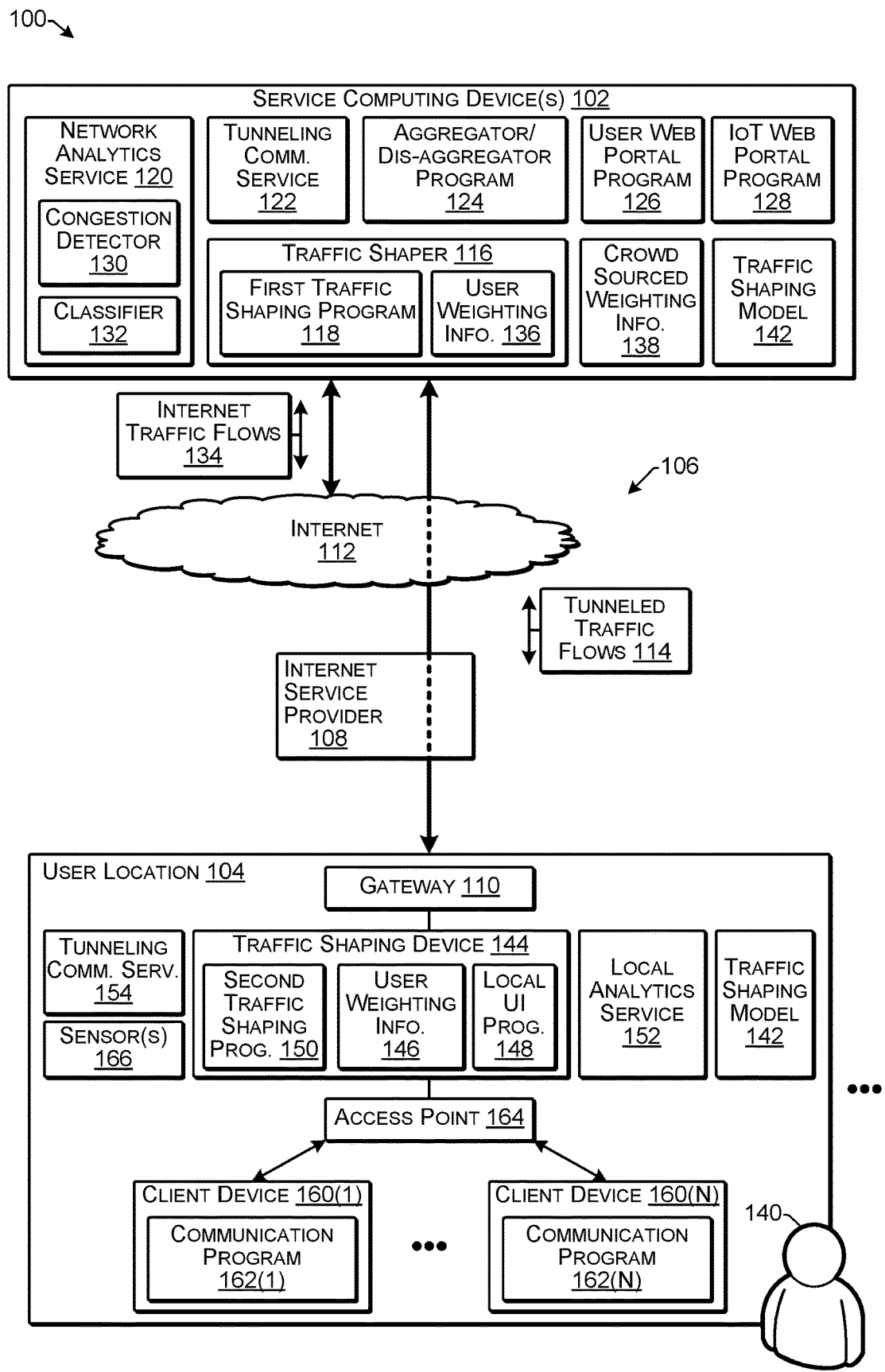
FIG. 1 illustrates an example architecture of a system configured to provide network traffic shaping according to some implementations.

Some implementations herein are directed to user-driven techniques and arrangements for traffic shaping of network communications, such as to manage network congestion, or the like. Some examples may include a plurality of components at one or more locations between the Internet and the user's local network for effecting traffic shaping of traffic flows. For instance, some implementations may control both sides of the user's Internet connection to provide traffic shaping capability for both inbound and outbound traffic flows, while other implementations may include traffic shaping capability on only one of these sides. As one example, the traffic shaping techniques and system herein may include a traffic shaping service provided on the Internet side, and a traffic shaping device on the user side.

In implementations herein, a traffic flow may include a sequence of packets directed from a source to a destination in a network. For instance, traffic flows may include a computer-to-computer communication path, a socket-to-socket communication path, or the like, identified by a unique combination of source and destination addresses and port numbers, together with a transport protocol (for example, User Datagram Protocol (UDP) or Terminal Control Protocol (TCP). In some examples, the traffic flows herein may be identified by five values in a 5-tuple set, e.g., (Protocol (e.g., TCP); Source Internet Protocol (IP) Address; Source Port; Target IP Address; Target Port) referred to as a 5-tuple identifier (ID). As one example, the traffic flows determined to be involved in causing congestion on a user's network may be identified based on the 5-tuple IDs of the particular traffic flows along with a timestamp of when a particular traffic flow was associated with congestion.

Some implementations herein may include a traffic shaping device (aka, "traffic shaper") associated with the user's local network through which outbound traffic flows may be passed. The traffic shaping device may bundle all outbound user data, or a subset of the outbound user data (e.g., particular traffic flows) indicated by the user, and deliver the data to a service computing device located over a wide area network. In addition, the service computing device may execute a traffic shaping program to serve as another traffic shaper for inbound traffic.

In some cases, a tunneling communication protocol, such as Internet Protocol Security (IPsec), Generic Routing Encapsulation (GRE), Secure Shell (SSH) tunnel, Layer 2 Tunneling Protocol (L2TP), Transport Layer Security (SSL/TLS), Datagram Transport Layer Security (DTLS), MICROSOFT® Point-to-Point Encryption (MPPE), MICROSOFT® Secure Socket Tunneling Protocol (SSTP), Ragula Multi Path Virtual Private Network, or the like, may be used to provide a virtual private network (VPN) or other tunneling communication service between the traffic shaping device at the user location and the service computing device. As one example, IPsec is a protocol suite for secure IP communications that works by authenticating and encrypting each IP packet of a communication session. IPsec includes protocols for establishing mutual authentication between agents at the beginning of the session and negotiation of cryptographic keys to be used during the session. Further, L2TP is a tunneling protocol that may be used to support VPNs or other tunneling communication services, but which does not provide any encryption or confidentiality by itself. Rather, L2TP may be used with an additional encryption protocol, such as IPsec, that is employed within the tunnel to provide privacy to a user. For instance, L2TP packets between two endpoints may be encapsulated by IPsec. In this case, since the L2TP packet itself is wrapped and hidden within the IPsec packet, no information about the internal private network can be determined from the encrypted packet. Additionally, as another example, GRE is a tunneling protocol that may encapsulate a wide variety of network layer protocols inside virtual point-to-point links over an IP network. Furthermore, while several example tunneling communication protocols are described that may be used to provide the tunneling communication services herein, implementations are not limited to those described examples, and additional protocols and communication services configurations will be apparent to those of skill in the art having the benefit of the disclosure herein.

Examination of the outbound and/or inbound traffic flows enables the current usage of the user's network to be determined. Traffic shaping of outbound data may be applied by the traffic shaping device at the user's location. The service computing device may unbundle the user's traffic-shaped outbound data and direct the outbound data to the next hop toward its ultimate destination. Concurrently, the traffic shaping program on the service computing device may receive all inbound data directed to the user from the Internet, may identify any congestion, may traffic shape and bundle the inbound data, and may direct the inbound data to the traffic shaping device at the user location over the VPN or other tunneling communication service.

In some examples herein, when congestion is detected for an unresolved contention between two or more traffic flows, a notification or other request may be presented to the user via a user interface or the like. Over time, one or more data structures of congestion events may be constructed, which the user may be able to view or otherwise access. In response to receiving a notification of a congestion event, the user may be presented with the user interface immediately, or the user may choose to access the user interface later. Upon accessing the user interface, the user may be presented with a list of events, at least some of which may be congestion event notifications. In response to the user selecting a particular congestion event, the user may be presented with a selection user interface that may include information from the 5-tuple IDs, flow type, or other identifiers of the traffic flows that were involved in the congestion event. As various examples, a list of traffic flows may be sorted in descending order of bandwidth consumed, in order of first congestion experience, or the like.

In some examples, the selection user interface may present the user with two traffic flows that are mainly responsible for the congestion event, though in other examples, as many as N traffic flows may be involved. For instance, the selection user interface may enable the user to choose between the two largest contributors to the congestion event for prioritizing one traffic flow over the other traffic flow. The user may be presented with a simple A/B choice, e.g., asking which traffic flow is more important. While in this implementation, a simple A or B choice is presented, in other implementations, the user interface may enable the user to specify how much more important traffic flow A is compared to traffic flow B, e.g., using a relative scale. After a user has identified a particular traffic flow as having a higher priority over another traffic flow, the traffic shaping on one or both sides (i.e., user location side and network location side) of the user's connection may give priority to the preferred traffic flow during the current use and also in the future.

Over time, the user may be presented with a plurality of A/B selections for a plurality of different congestion events. As the user makes the plurality of A/B selections, a priority graph or other data structure may be generated based on the selected preferred and non-preferred traffic flows. For instance, some or all of the A/B decisions may be used to create an overall priority graph or other data structure that can be used by the traffic shaping programs to eliminate future congestion among the identified traffic flows when the identified traffic flows are competing for limited bandwidth.

In the case that the traffic shaping herein is applied in a residential environment, one member of a household may have control of the traffic shaping for the local network. However, in other cases, the household may have multiple users able to select the A/B priorities for various traffic flows. Accordingly, some examples herein may include a weighting among the multiple users that are able to set priorities for traffic flows. As one example, an adult's preferences may be more heavily weighted than a child's preferences.

Additionally, some examples herein may include an implementation of crowd-sourced decisions. For instance, the service computing device may aggregate the traffic flow priority selection decisions from a plurality of different users possibly associated with different user locations, and may use the aggregated traffic flow priority weightings to determine a default preference ordering for traffic flows of various different types. In this example, decisions made by a particular user may be forwarded to the service computing device or other central repository to be used for generating a traffic shaping model based on the aggregated decisions from the plurality of users. The traffic shaping model may then be fed back to the individual traffic shaping devices at the respective user locations to use for prioritizing traffic flows at the traffic shaping devices, and also may be applied by the traffic shaping program on the service computing device to use for prioritizing traffic flows at the service computing device. As one example, the traffic shaping programs on the service computing device and the traffic shaping device may use the crowd-sourced traffic shaping model if more specific data from a particular user has not yet been provided. As another example, crowd-sourced and user-sourced traffic shaping information may be used together, and the traffic shaping model may weight the user-sourced preferences more strongly than crowd-sourced preferences.

Furthermore, the degree to which the traffic shaping programs are able to correlate known traffic flow types to unknown flow types allows the traffic shaping programs to apply user preferences to new or otherwise unknown flow types. For example, a NETFLIX® traffic flow on a new device (e.g., a new device that is not mainTV) might be automatically given a higher priority because of its commonality with NETFLIX® traffic flow on mainTV, which has previously been given a high priority. As another example, entirely unknown traffic flows may be given a low priority weighting until a user selection or a crowd-sourced update has given the unknown traffic flow a different priority weighting.

In addition, some examples may employ a computational model, such as a neural network, when performing the flow identification and/or traffic shaping herein. As one example, the crowd sourced engine discussed above may be replaced by or supplemented with a trained neural network to widen the number of cases in which the system itself may identify which traffic flows should be given priority. Additionally, the neural network may apply weightings based on the sources of decisions, e.g., user sourced-decisions may be weighted greater than crowd-sourced decisions, and crowd-sourced decisions may be weighted higher than neural net-sourced decisions.

In addition, implementations herein may be automated for determining a priority for Internet of Things (IoT) communications. In the case where there is no decision information whatsoever for resolving resource contention, it may be undesirable to simply leave the situation unresolved. Accordingly, one example may employ random prioritization for IoT devices. For example, randomly selecting one previously unselected traffic flow over another is likely to reduce user dissatisfaction to 50%.

Additionally, other information may be used for determining which IoT traffic flow to prioritize, and the priority for IoT devices or other traffic flows may change dynamically based on gathered information. For example, localization information, i.e., determining where the user is located with respect to a particular IoT device may provide an indication of whether the traffic flow for a particular IoT device should be prioritized over other IoT devices without requiring input from the user. For example, knowledge of a user's location via cameras, passive infrared (PIR) sensors, proximity sensors, geolocation data from a user's smart phone, or other sensed information, may enable the traffic shaping system to identify traffic shaping priorities for IoT devices or other traffic flows without asking the user. For instance, if no users are in a room with the main TV, the priority of the traffic flow travelling to the TV may be lowered until someone enters the room. As another example, the washing machine in the laundry room, may be given a very low priority, but if someone enters the laundry room a higher priority may be applied to the washing machine and/or other devices present in the laundry room. Furthermore, pose data may also be considered. For example, if the user is facing away from a device having a display, then the priority may be lower than if the user is facing toward the display. Similarly, if the user places a device on a surface with its display face down, the priority may be lower than if the display is facing upward.

In addition, live interaction with an IoT device may indicate that a higher priority may be assigned to the IoT device. For instance, some IoT devices may produce a sudden increase in network traffic, indicating that the user is actually interacting with the device. Thus, the particular device may be given a higher priority at that time and a lower priority at other times. As one example, when a car is sitting alone in a garage, the priority may be lower; however, if the vehicle becomes occupied or the ignition is activated, the priority may be raised to be higher.

As mentioned above, some examples herein may employ a VPN or other tunneling communication service to tunnel some or all of a user's inbound and outbound data between the traffic shaping device at the user location and the service computing device at the network location. For instance, the user's data sent over the tunneling communication service may be compressed for saving user bandwidth and increasing performance Additionally, the user's data may be encrypted for providing additional security. Additionally, the user's data may be anonymized to provide additional privacy. The outbound compressed, encrypted, and anonymized data received over the tunneling communication service is dis-aggregated by the service computing device and sent on to the Internet, while the inbound compressed, encrypted, and anonymized data received over the tunneling communication service from the service computing device is dis-aggregated at the traffic shaping device at the user location and sent to the designated client user devices over the local area network. Thus, with the tunneling communication service herein, the inbound and outbound data can be controlled based on user specified preferences for providing a substantially enhanced quality of service experience. Accordingly, implementations herein may provide an improved bi-directional quality of service based on traffic flow control, and may further provide privacy, anonymity, compression, prioritization, and security.

Additionally, implementations herein may generate one or more graphs or other data structures based on user preferences determined from flow and device utilization over time, such as according to user device (e.g., based on Media Access Control (MAC) address or other device identifier), flow type, upstream and downstream network performance, aggregation by service, per-traffic-flow analysis, and so forth. Further, some implementations may provide a simplified methodology for admitting new user devices onto the network, admitting and managing of IoT devices, and may provide user interfaces to users by a web interface provided to a client device, a user interface provided locally by the traffic shaping device, a mobile device application, or by other technologies, and may enable prioritization by device, by service type, or the like.

Further, some examples enable increasing or decreasing priority weightings dynamically based on scheduling, user location within a monitored area, user pose information, device pose information, device access information, and so forth. As one example, the traffic shaping device may turn network access off for some user devices based on schedule, length of time access has been on-going, or the like. Further, the system herein provides fully extensible inbound and outbound traffic flow control and prioritization, e.g., through use of a tunneling communication service, LINUX® containers and/or other virtualization or process isolation techniques known in the art, to provide bi-directional traffic flow control. Further, the system may collect network performance metrics, which may be internally logged for local display. Additionally, the user may be provided with a local UI and/or a web portal to access performance data. Further, some examples provide a platform to enable aggregation of IoT communications, which can reduce upstream traffic load and take advantage of compression and privacy enhancement. In addition, an IoT web portal may enable the user to control existing devices and discover new IoT devices that have been connected to the network e.g., via Wi-Fi protected setup.

For discussion purposes, some example implementations are described in the environment of traffic shaping in a residential or business setting. However, implementations herein are not limited to the particular examples provided, and may be extended to other system configurations, other types of traffic shaping devices, other types of environments, and so forth, as will be apparent to those of skill in the art in light of the disclosure herein.

FIG. 1 illustrates an example architecture of a system 100 configured for traffic shaping according to some implementations. The system 100 includes a least one service computing device 102 that is able to communicate with a user location 104, such as through one or more networks 106. As one example, the user location 104 may by connected to an Internet service provider (ISP) 108 through a gateway 110. In some examples, the gateway 110 may include one or more of a modem, a fiber connection, an RJ45 jack, a coaxial cable jack, or other suitable connection technology, to connect the user location 104 to the ISP 108. Further, the service computing device 102 may be able to communicate with the ISP 108 such as through the Internet 112, or other network connection, as part of the one or more networks 106. As mentioned above, the user location 104 may be a residence, a business, an organization, or any other location or entity having a network that may benefit from the traffic shaping techniques described herein. Furthermore, while a single user location 104 is illustrated in this example for clarity, there may be any number of the user locations 104, each of which may employ the traffic shaping techniques described herein.

In some cases, a tunneling communication service may be employed over the one or more networks 106 between the user location 104 and the service computing device 102 such that any tunneled traffic flows 114 sent between the user location 104 and the service computing device 102 may pass through the ISP 108. Additionally, in some instances, the tunneled traffic flows 114 may be encrypted and/or anonymized, and may pass through the ISP 108 without the ISP 108 being able to see the data content. In other instances, the tunneled traffic flows 114 might not be encrypted and/or anonymized. Further, while the service computing device 102 is shown as being in communication with the ISP 108 over the Internet 112 in this example, in other examples, the service computing device 102 may be co-located with, or otherwise affiliated with, the ISP 108.

In some examples, the at least one service computing device 102 may include one or more servers or other types of computing devices that may be embodied in any number of ways. Example hardware configurations of the service computing device 102 are discussed below with respect to FIG. 17. The service computing device 102 may include a traffic shaper 116 that may include a first traffic shaping program 118. The first traffic shaping program 118 may include or may access a plurality of additional programs and/or services such as a network analytics service 120, a tunneling communication service 122, an aggregator and dis-aggregator program 124, a user web portal program 126, and an Internet of Things (IoT) web portal program 128. For instance, the network analytics service 120 may include a congestion detector 130 for detecting congestion in the one or more networks 106 associated with the user location 104. Further, the network analytics service 120 may include a classifier 132 for identifying the types of the traffic flows, such as based on source IP address, data type, or the like.

In some examples, the congestion detector 130 may be a program that is executed by the one or more service computing devices 102. In order to detect congestion, the congestion detector 130 may initially determine the user's baseline bandwidth. Various techniques may be used for determining the user's baseline bandwidth. In some cases, the user's bandwidth may be determined using User Datagram Protocol (UDP) saturation techniques. For instance, the user's bandwidth capability may be determined by measuring the throughput between the service computing device and the traffic shaping device at the user location. The throughput may be determined in both the inbound and outbound directions by flooding the user's network with UDP packets.

Alternatively as another example, the user's baseline bandwidth capability may be determined using Transmission Control Protocol (TCP) congestion management strategies. For instance, as the connection between the service computing device and user's network becomes congested in the TCP domain, TCP will attempt various congestion management strategies, which can be detected by the service computing device and/or the traffic shaping device. By examining the throughput of all flows in comparison with the expected throughput, potential congestion can be identified. Further, congestion can be identified by examining the TCP congestion management attempts of various TCP flows that are engaging in congestion management. Further, other congestion detecting techniques will be apparent to those of skill in the art having the benefit of the disclosure herein.

In addition, the classifier 132 may be a program that is executed to determine information about the traffic flows. For instance, when congestion is detected, the classifier 132 may determine and provide information about the traffic flows that are causing the congestion. For example, the classifier 132 may be executed by the service computing device 102 to read the headers of packets associated with each traffic flow for determining, e.g., information for the 5-tuple identifier of each traffic flow, the data type of the traffic flow, the source of the traffic flow, and the like. In the case of inbound traffic flows 134 from the Internet 112, the classifier 132 may identify the sources of the packets associated with different traffic flows 134, and may determine the relative number and size of the packets for each different traffic flow to identify which of the traffic flows are contributing most to the congestion.

In addition, the tunneling communication service 122 may include one or more programs and protocols that are executed to enable a VPN or other tunneled communications (as described above) over the one or more networks 106 between the service computing device 102 and the gateway 110 at the user location 104. The use of the tunneling communication service 122 enables the traffic shaper 116 and the user location 104 to communicate directly with each other, and avoids having the ISP 108 divert communications to the Internet 112, or the like, which would defeat traffic shaping of the inbound Internet traffic flows 134. Additionally, the aggregator/dis-aggregator program 124 may be executed by the service computing device 102 to aggregate and bundle packets for various traffic flows that are sent over the tunneling communication service to the user gateway 110 as part of the traffic shaping. Further, the aggregator/dis-aggregator 124 may dis-aggregate bundled packets that are received over the tunneling communication service from the gateway 110, and direct these packets to their intended destination over the Internet 112.

In some examples, the first traffic shaping program 118 may receive priority weighting decisions made by a plurality of users at a plurality of user locations 104 such as for collecting crowd-sourced weighting information 138. As mentioned above, some examples herein may include a crowd-sourced decision making implementation. Thus, the first traffic shaping program 118 on the service computing device 102 may aggregate the weighting selections made by a plurality of users as crowd-sourced weighting information 138, and may use the crowd-sourced weighting information 138 to determine a default weighting for prioritizing various different traffic flows. Thus, the weighting decisions made by a plurality of users 140 at a plurality of different user locations 104 may be forwarded to the service computing device 102. The first traffic shaping program 118 may receive the weighting priority decisions from the plurality of the user locations 104 and may aggregate these weighting decisions as the crowd-sourced weighting information 138. Furthermore, the first traffic shaping program 118 may use the crowd-sourced weighting information 138 to generate a crowd sourced traffic shaping model 142.

In some examples, the traffic shaping model 142 may be sent or otherwise provided to a traffic shaping device 144 at each user location 104 to use for shaping outbound traffic flows. In addition, in some examples, the traffic shaping model 142 may be applied by the first traffic shaping program 118 on the service computing device 102 for shaping inbound traffic flows directed to the gateway 110. As one example, the traffic shaper 116 and/or traffic shaping device 144 may use the crowd-sourced traffic shaping model 142 if more specific data from the user 140 has not yet been provided. As another example, the crowd-sourced traffic shaping model 142 may be used together with the user-provided weighting information 136, 146. In such a case, the traffic shaper 116 and/or traffic shaping device 144 may weight the user's own weighting in the user weighting information 136, 146 more highly than the crowd-sourced weightings expressed in the traffic shaping model 142.

Alternatively, as another example, one or more separate service computing devices 102 may receive and aggregate the crowd-sourced weighting information 138. Accordingly, the separate service computing device(s) may act as a central repository of crowd-sourced weighting information 138, and may perform processing to determine an initial traffic shaping model 142. The initial traffic shaping model 142 may then be customized for each user based on user weighting information received from each user either at the separate service computing device(s) 102, or at a service computing device 102 that performs traffic shaping for the user. Additionally, in some examples, there may be an individual service computing device 102 provided per user location 104 or per a plurality of assigned user locations 104. Thus, in some examples, there may be a large number of service computing devices 102 dedicated to performing the traffic shaping herein, while one or more other service computing devices 102 may receive and analyze the crowd-sourced weighting information 138 and may generate the traffic shaping model(s) 142.

In some examples, the user 140 may use the user web portal 126 when making selections of traffic flows for specifying a priority of one traffic flow over another and/or for managing the traffic shaping. As one example, the user web portal 126 may present a user interface to the user 140, as discussed additionally below to enable the user to select a particular traffic flow or manage the traffic shaping settings. Alternatively, a local user interface 148 may be executed at the user location by the traffic shaping device 144 for presenting the user interface to the user 140. Additionally, the IoT web portal may be used by the user in a similar manner to manage IoT traffic shaping preferences for the user's IoT devices.

As mentioned above, in some examples, there may be a traffic shaping device 144 at the user location 104. For example, the traffic shaping device 144 may traffic shape the outbound traffic sent from the user location to the service computing device 102, while the traffic shaper 116 on the service computing device 102 may shape the inbound traffic from the Internet 112 to the user location 104. The traffic shaping device 144 may include a second traffic shaping program 150 that is executed by a processor (not shown in FIG. 1) of the traffic shaping device 144. An example hardware configuration of the traffic shaping device 144 is discussed below with respect to FIG. 16.

The second traffic shaping program 150 may include, or may use, additional programs and/or services, such as the local user interface (UI) 148, a local analytics service 152, and a tunneling communication service 154. For instance, the tunneling communication service 154 may work in conjunction with the tunneling communication service 122 at the service computing device 102 to generate a VPN or other tunneled communications across the one or more networks 106 between the gateway 110 and the service computing device 102. In addition, in some cases, the local analytics service 152 may perform a function similar to the network analytics service 120, and may include a congestion detector program and/or a classifier program in some examples (not shown in FIG. 1), which may function in a manner similar to the congestion detector 130 and classifier 132, respectively, discussed above.

The user location 104 may include a plurality of client devices 160(1)-160(N) that send and/or receive data over the one or more networks 106. For example, each client device 160(1)-160(N) may include a communication program 162 (1)-162(N), respectively, that may be executed by the client device to perform communication functions, depending on the nature and purpose of the respective client device. For example, the client devices 160 may be any type of device that is configured to send or receive data over a network. Thus, the client devices may include computers such as desktop computers, laptops, tablet computing devices, mobile computing devices such as cellphones and smartphones, wearable computing devices, server computing devices, workstations, and so forth. Additionally, or alternatively, the client devices 160 may include consumer electronics such as gaming consoles, virtual reality equipment, televisions, DVD players, digital video recorders, telephones, webcasters, and so forth. Additionally, or alternatively, the client devices 160 may include connected IoT devices, such as appliances, home automation hubs, thermostats, surveillance cameras, locks, lighting controls, alarm systems, automobiles, and so forth. Further, in some examples, the communication program 162 may include, or may be replaced by, one or more of logic circuits, firmware, or the like, depending on the nature of the client device 160.

The client devices 160 may connect to one or more access points 164 by at least one of a wireless connection or a wired connection. In the illustrated example, the traffic shaping device 144 is logically positioned between the access point 164 and the gateway 110, but other configurations may be used in other examples. In some examples, the gateway 110, the second traffic shaper 114, and/or the access point 164 may be combined into a single device, and, as one example, may share one or more processors and/or memory. In other examples, the gateway 110 and/or the access point 164 may be separate devices from the traffic shaping device 144. Various other hardware configurations will be apparent to those of skill in the art having the benefit of the disclosure herein.

The first traffic shaping program 118 and/or the second traffic shaping program 150 may be executed to manage the traffic along the one or more networks 106 for controlling congestion and improving the user experience. For example, the first traffic shaping program 118 configures the service computing device 102 as a particular uniquely designed machine to manage the network traffic coming from the Internet 112 to the gateway 110. Further, the second traffic shaping program 150 configures the traffic shaping device 144 as a particular uniquely designed machine to manage network traffic being sent from the client devices 160 over the one or more networks 106. Thus, the traffic shaper 116 and/or traffic shaping device 144 herein improve the operation of the one or more networks 106 and improve the operation of one or more client devices 160, such as based on indicated user preferences.

In some examples, the traffic shaping programs 118, 150 may perform traffic shaping by delaying packets of lower priority traffic flows and not delaying packets of higher priority traffic flows, as determined based on the weightings discussed herein. Numerous techniques are available for performing the traffic shaping. As one example, the traffic shaping programs 118, 150 may employ hierarchical token bucket strategy (HTB) as a technique for delaying certain packets to achieve traffic shaping. Further, while HTB is discussed herein as one technique for traffic shaping, various other techniques may be used in other implementations herein, as will be apparent to those of skill in the art having the benefit of the disclosure herein.

Additionally, in some examples, the system 100 may include one or more sensors 166 at the user location 104. In some examples, the sensors 166 may communicate with the traffic shaping device 144 over the local network, e.g., via the access point. In other examples, the sensors 166 may communicate over the one or more networks 106, similar to other IoT devices. As mentioned above, the sensors 166 may be used for determining user locality information, user or device pose information, user presence information, user interaction information, and so forth. For example, the sensors 166 may include cameras, passive infrared (PIR) sensors, geolocation data from a user's smart phone, proximity sensors, or various other sensors. The sensor information may enable the traffic shaping system to identify traffic shaping priority weightings for IoT devices without asking the user. For instance, if there are no users currently in a room with a TV streaming video, the priority weighting of the traffic flow to the TV may be lowered until someone enters the room. Similarly, pose data may indicate that a user is facing away from a device, and the priority weighting of the device may be lower than if the user is facing the device. Various other examples are discussed additionally herein.

Figure 2:
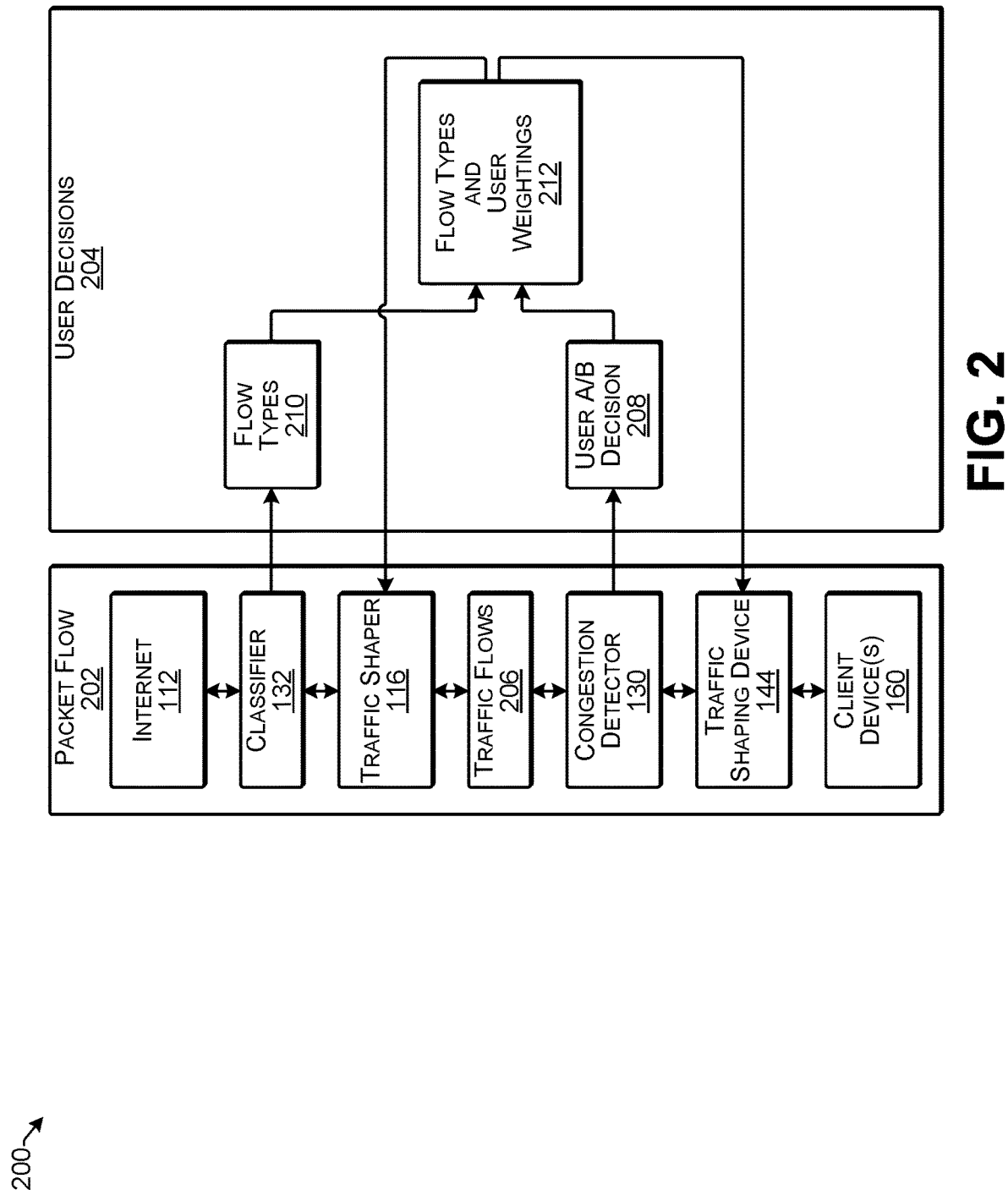
FIG. 2 illustrates an example of a traffic shaping logical configuration according to some implementations.

FIG. 2 illustrates an example logical configuration 200 for performing traffic shaping according to some implementations. The logical configuration 200 includes a packet flow 202 and user decisions 204. For example, the packet flow 202 shows the transmission of traffic flows 206 between the Internet 112 and the client devices 160. Thus, a traffic flow 206 traveling from the Internet 112 to the client device 160 may be detected by the classifier 132 to determine flow type and may be provided to traffic shaper 116, which may determine whether to perform traffic shaping with respect to particular flow types. Further, the traffic flows 206 may be measured by the congestion detector 130 before being delivered to the client device 160. Similarly, a traffic flow 206 passing from the client device 160 to the Internet 112 may pass through the traffic shaping device 144, may be measured by the congestion detector 130, and may be detected by the classifier 132 to determine a flow type before being transmitted to the Internet 112. Additionally, in some cases, a second classifier (not shown in FIG. 2) may be executed by the traffic shaping device 144, such as for classifying outbound traffic flows.

In this example, the congestion detector 130 is illustrated as being executed at the user location, e.g., by a processor of the traffic shaping device 144. Additionally, in some cases, a second congestion detector 130 (not shown in FIG. 2) may be executed at the non-user end in place of, or in addition to, the congestion detector 130 at the user end, such as for identifying congestion from the non-user end. For example, the congestion detector 130 may be executed at the one or more service computing devices 102 discussed above with respect to FIG. 1. Additionally, or alternatively, the congestion detector 130 may be executed at a facility of the ISP 108 discussed above with respect to FIG. 1, such as in the case that the traffic shaper 116 and/or other traffic shaping components are located at the ISP 108. For instance, if the ISP 108 is not restricted by net neutrality rules, some or all of the functionality associated with the service computing device (s) 102 may be located at and/or operated by the ISP 108.

Furthermore, the user decisions 204 may include determining user A/B decisions 208 for the detected flow types 210. Thus, the flow types 210 for the flows 206 may be determined by the classifier 132 such as based on the 5-tuple ID associated with the flow, an examination of the data itself to determine identifying information, a determination of the source of the data, or the like. Furthermore, the congestion detector 130 may detect congestion in the user's network and may generate a notification and/or may cause the user interface program (not shown in FIG. 2) to generate a user A/B decision 208 for the two flow types that are causing the most congestion in the user's network. As indicated at 212, the flow types and the user decision results for the flow types may be provided to at least one of the traffic shaper 116 and/or the traffic shaping device 144.

Figure 3:
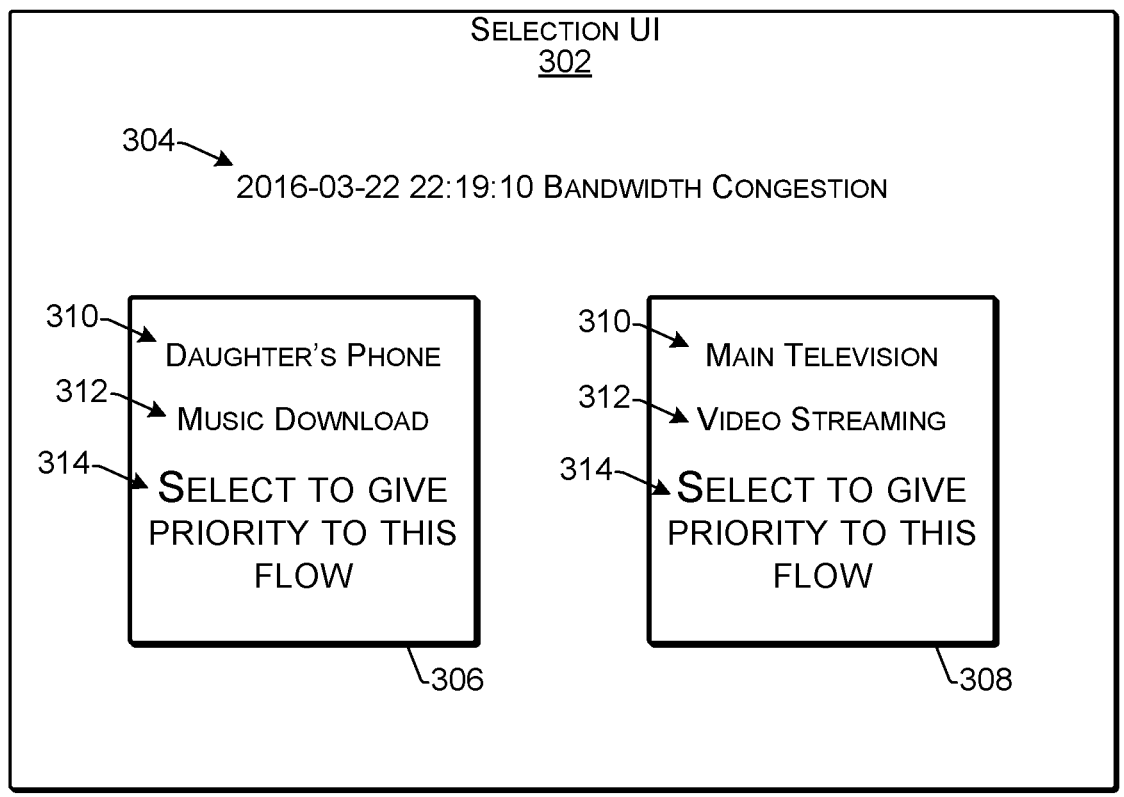
FIG. 3 illustrates an example user interface for selecting a traffic flow according to some implementations.

FIG. 3 illustrates an example of a selection user interface 302 for assigning a priority weighting to one or more traffic flows according to some implementations. As mentioned above, in some examples, the selection user interface 302 may be included with a notification or other request that is provided to a user to resolve a network congestion event. In other examples, the user interface 302 may be accessed by the user such as through a local user interface program, a web interface, a web portal, or the like. In this example, the selection user interface 302 includes a time stamp 304 associated with the bandwidth congestion. Further, the selection user interface 302 includes at least two virtual controls for selecting priority weightings for particular traffic flows. Thus, the selection user interface 302 includes a first virtual control 306 and a second virtual control 308, which may be configured as buttons or various other types of user-selectable virtual controls.

Additionally, associated with the virtual controls 306 and 308 may be information regarding the respective traffic flows, such as a device ID 310, a category of traffic flow 312, and an indication 314, such as a message that the user may tap on, click on, or otherwise select the virtual control 306 or 308 to assign a priority weighting to the corresponding traffic flow on the specified device. Alternatively, as another example, rather than having just an A/B selection available, the user interface 302 may provide a list of a plurality of traffic flow types and may allow the user to assign a ranked order of priority weightings to the listed plurality of traffic flows. Accordingly, while FIG. 3 illustrates one example user interface for discussion purposes, numerous other user interface configurations will be apparent to those of skill in the art having the benefit of the disclosure herein.

Figure 4:
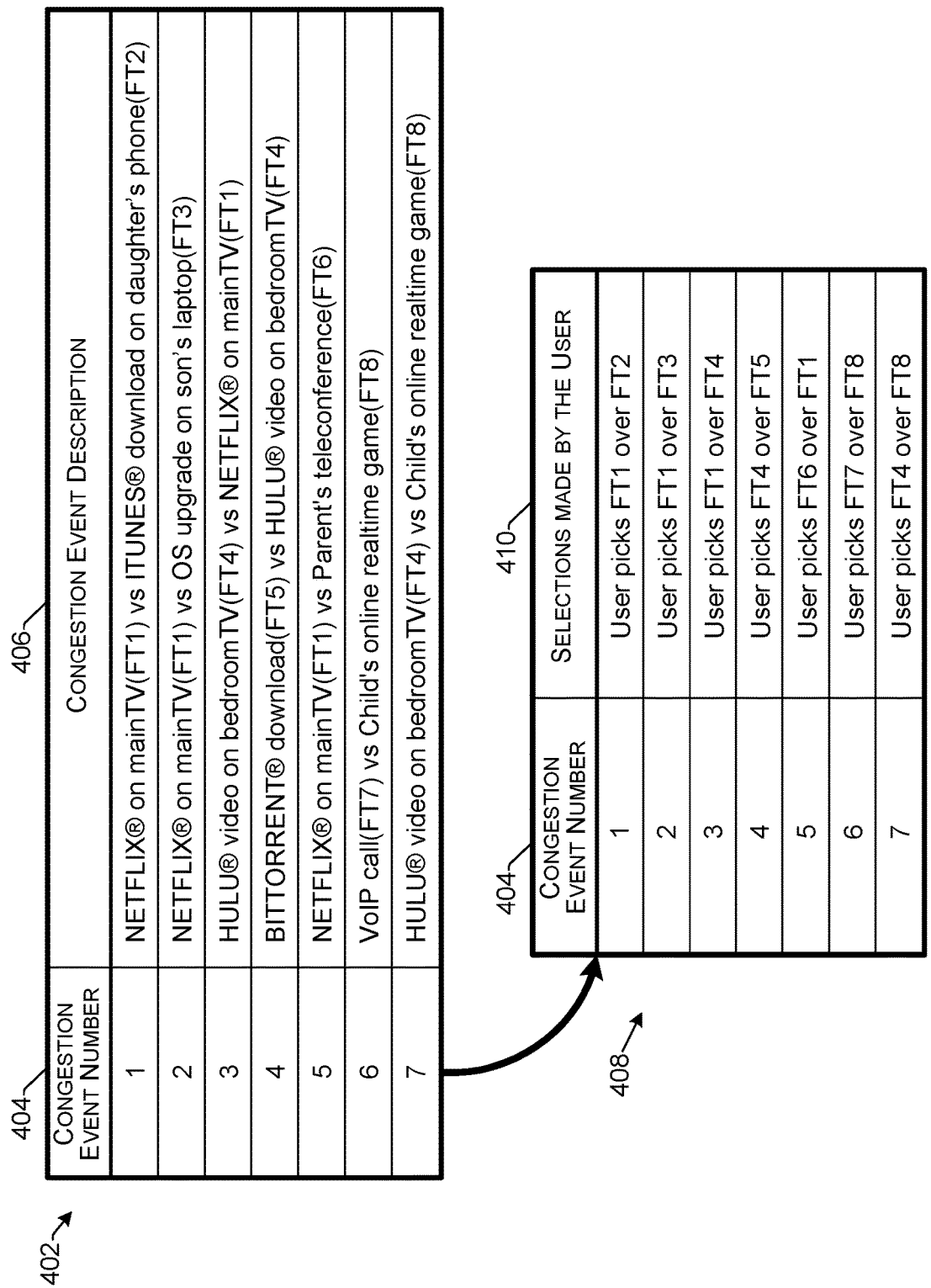
FIG. 4 illustrates example data structures for congestion event resolution according to some implementations.

FIG. 4 illustrates example data structures that may be generated for congestion events and corresponding user selections according to some implementations. A data structure 402 includes a first column 404 for indicating a congestion event number, which may be a sequential number, based on when the congestion events occurred. For example, congestion events may correspond to congestion being detected on the user's network. The traffic flows primarily responsible for the congestion may be identified as being in contention for the network resources.

The data structure 402 includes a congestion event description 406, which may indicate the flow type (FT) of each traffic flow that is contending for the bandwidth. Accordingly, in the examples that are directed to AB style selection, for each congestion event, there may be two flow types (FT) identified as being in contention with each other, i.e., the two largest contributors to the congestion. Each flow type (FT) may include identifying information such as the type of data, a source or destination of the data, and/or a local device associated with the traffic flow to enable the user to better identify the flow types in contention. As an example, for the first congestion event, the user may select either "NETFLIX® streaming on mainTV", designated as flow type FT1, or "ITUNES® download on a daughter's phone", designated as flow type FT2.

Data structure 408 may maintain the selections made by the user in column 410 in association with the congestion event number 404. For example, the data structure 408 indicates that the user selected flow type FT1 (i.e., NETFLIX® streaming on mainTV) to have a higher priority weighting than flow type FT2 (i.e., ITUNES® download on a daughter's phone). Thus, a plurality of selections may be presented to the user for a plurality of different congestion events, and the resulting selections may be maintained in the data structure 408.

FIG. 5 illustrates example data structures that may be generated based on priority weightings corresponding to the user selections according to some implementations. A data structure 502 may maintain simple weightings of A vs. B selections made by the user. The data structure 502 includes a first column 504 for indicating selections made by the user for each congestion event, where a "+" indicates that the user selected the flow type over another flow type, and a "−" indicates that the user selected the other flow type. Accordingly, in this example, the first flow type (FT1) was selected three times, and not selected one time, and thus, has "+++−" indicating the user selections. Furthermore, the data structure 502 includes a resulting relative weighting 506. For instance, each "+" received may add one point to the rank 506 and each "−" may subtract one point from the rank for the particular flow type.

Data structure 508 maintains ordered relative weightings in which the order of the flow type selections is based on the relative weightings 506 for each flow type. Furthermore, data structure 508 may associate a flow type description 510 with the respective selections 504 and weighting 506 for each flow type listed in the data structure 508. The relative weightings 506 may be used by the traffic shaping programs 118 and/or 150 discussed above with respect to FIG. 1 to determine a priority to assign to various traffic flows that may be involved when traffic congestion in detected. Furthermore, while the relative weightings 506 in data structure 508 represent one technique by which traffic shaping may be performed on various flow types, other types of priority weightings may be determined from the user selections, as discussed additionally below, and may be used for traffic shaping in addition to, or as an alternative to the relative weightings 506.

Figure 6:
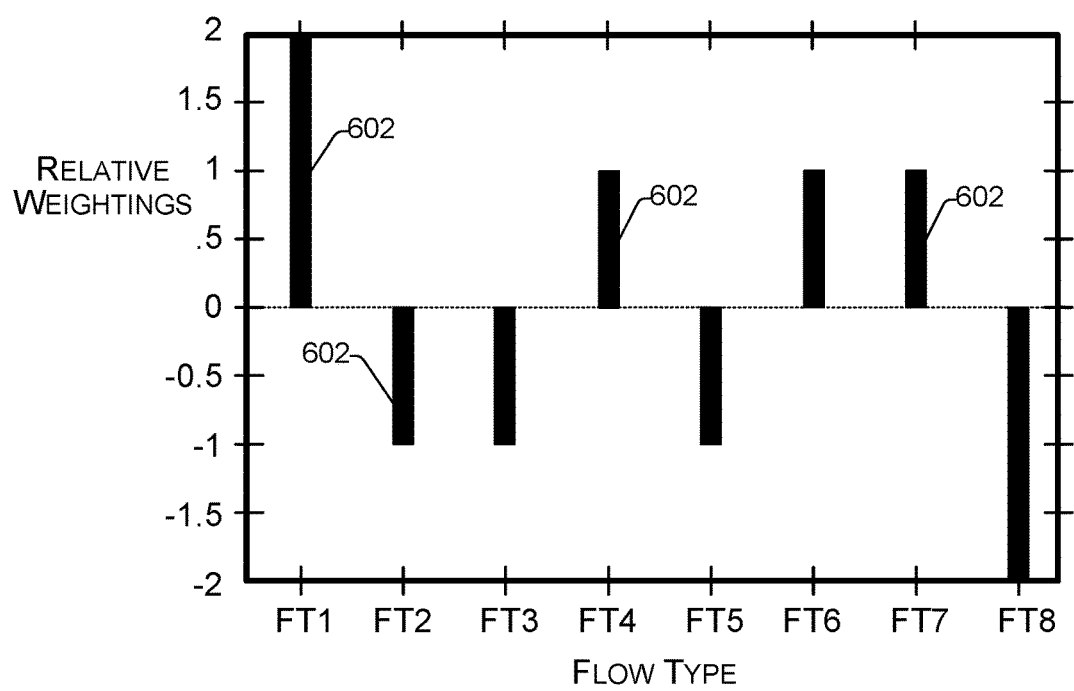
FIG. 6 illustrates an example graph data structure of relative weightings for traffic shaping according to some implementations.

FIG. 6 illustrates an example graph data structure 600 of relative weightings to use for traffic shaping according to some implementations. For example, the graph data structure 600 includes a plurality of bars 602, each indicating a relative weighting for each flow type FT1-FT8, as determined, e.g., from the data structures 502 and/or 508. Thus, the graph 600 indicates that the first flow type FT1 has a weight of 2, the second flow type FT2 has a weight of minus 1, and so forth. The graph 600 may be used by the traffic shaping programs 118, 150 when prioritizing traffic flows for performing traffic shaping on the corresponding flow types. For example, network congestion is detected, and the two main contributors are determined to be FT1 and FT3, the traffic shaping program 118 may prioritize the packets of traffic flow FT1 over the packets of traffic flow FT3 based on the graph 600 and/or the relative weightings in the data structure 508.

Figure 7:
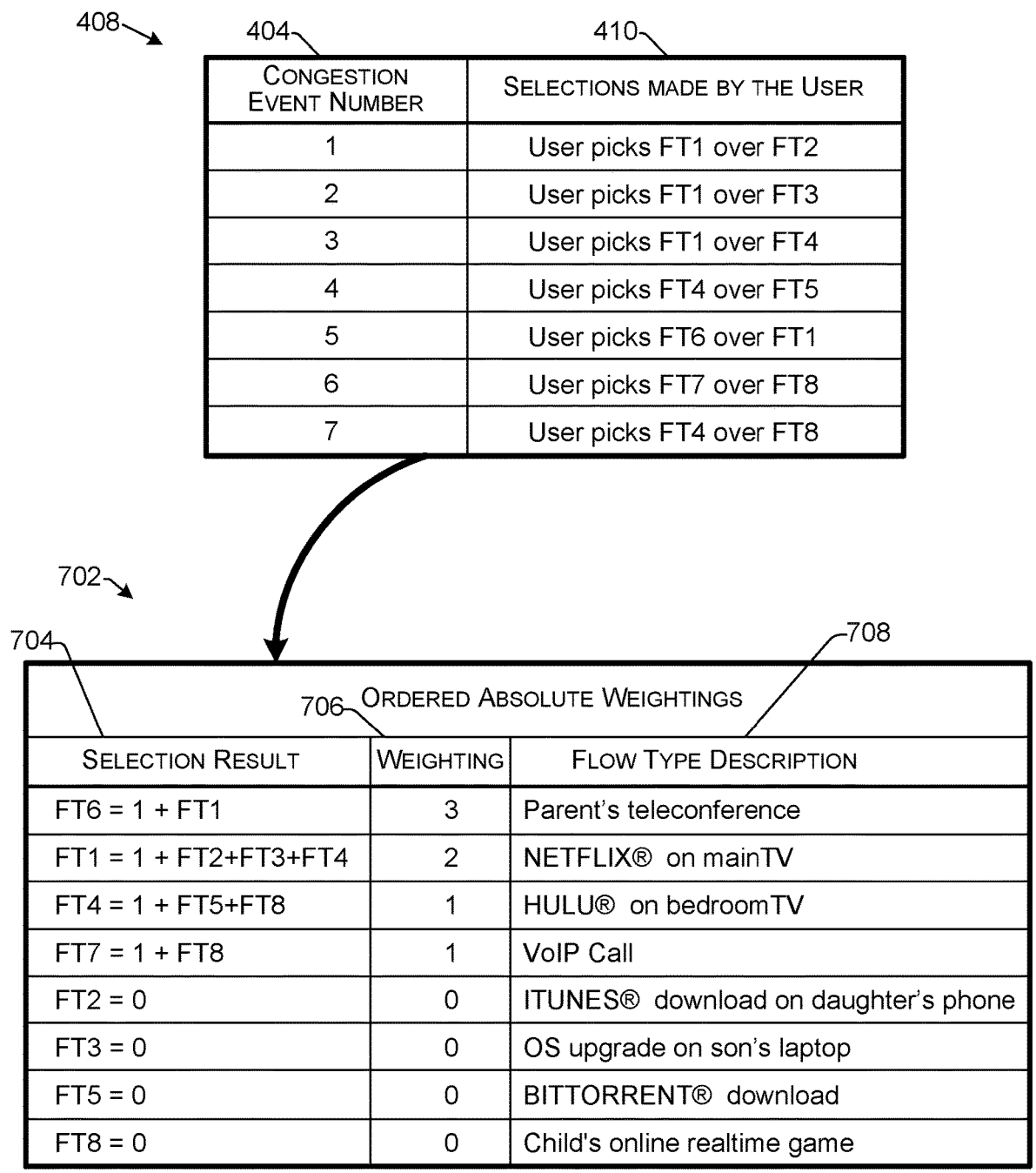
FIG. 7 illustrates an example data structure including ordered absolute weightings for traffic shaping according to some implementations.

FIG. 7 illustrates an example data structure that may be generated based on weightings corresponding to user selections according to some implementations. In this example, a data structure 702 of ordered absolute weightings may be generated in addition to, or as an alternative to, the relative weightings discussed above with respect to FIGS. 5 and 6. In this example, the A/B type selections made by the user 410 in data structure 408 may be used to determine the ordered absolute weightings in the data structure 702. The data structure 702 includes selection results 704, absolute weighting 706, and flow type description 708.

In this example, the absolute weighting for a selected flow type is determined by adding 1 plus the weighting of the losing flow type(s). For instance, as indicated at congestion event 5 in data structure 408, the user selected flow type FT6 over flow type FT1. Thus, the weighting for flow type FT6 is 1 plus the weighting of flow type FT1, which at this point in time is 2, so that the weighting of flow type FT6=3. As additional user selections are made, the weighting of all of the flow types may be updated to reflect the new weightings. Further, until a user selection has been made, the weighting of a flow type may be "0". As an example, suppose that there is a contention between FT2 and FT5, which is causing congestion. The user may be presented with a user interface to select between FT2 and FT5. Suppose that the user selects FT5 over FT2. Thus, the weighting for FT5 would be changed to 1+FT2=1, the weighting for FT4 would be changed to 2, the weighting for FT1 would be changed to 4, and the weighting for FT6 would be changed to 5.

Additionally, while two examples of determining weightings for traffic flows are described herein, numerous other weighting techniques will be apparent to those of skill in the art having the benefit of the disclosure herein. For example, the weightings may include a time component in which a weighting may be downgraded after the passage of a specified amount of time. Additionally, or alternatively, as mentioned above, crowd-sourced weightings may be applied to some or all of the traffic flow types until the user has specified a user-preferred weighting for particular traffic flows. As still another example, rather than using A/B selection, the user may be presented with a list of, e.g., ten different traffic flow types that have been determined to consume the most bandwidth on the user's network, and the user may be asked to assign a ranking of 1-10 to the traffic flows in the list, such that a highest-weighted traffic flow has the highest priority, a next highest-weighted traffic flow has the next highest priority, and so forth.

Figure 8:
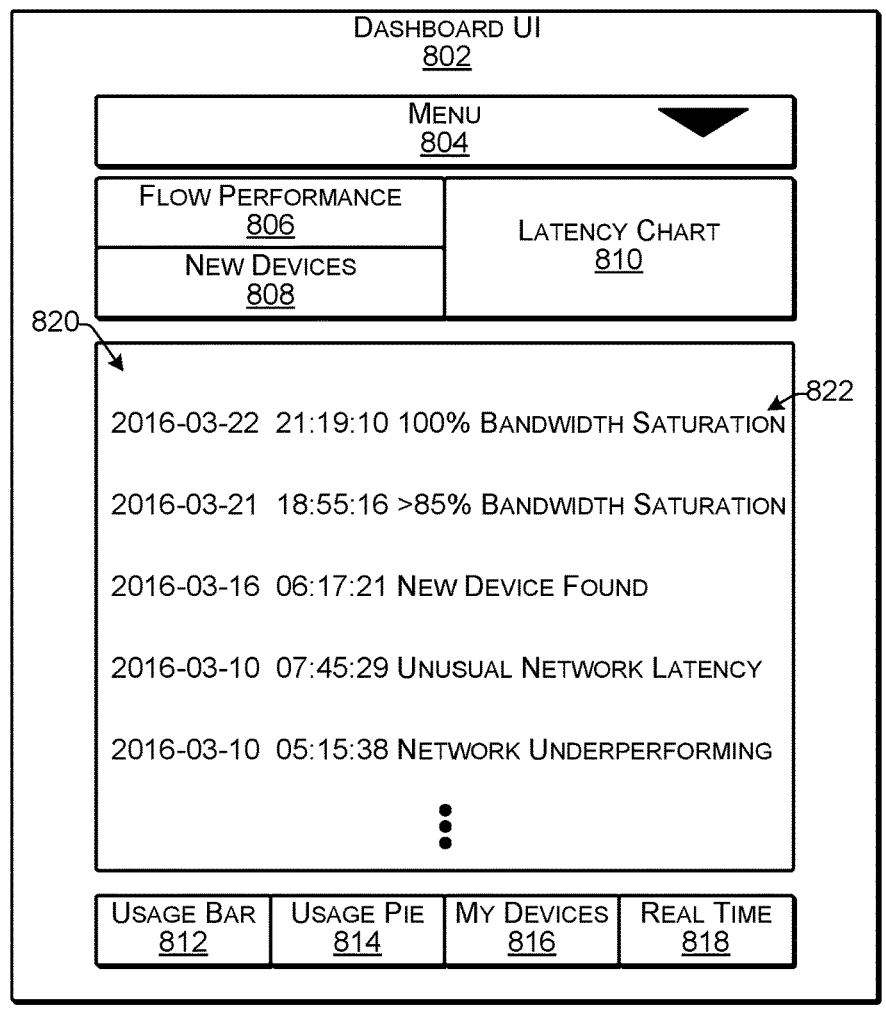
FIG. 8 illustrates an example user interface for managing traffic shaping according to some implementations.

FIG. 8 illustrates an example user interface 800 for managing traffic flows according to some implementations. The user interface 800 may include a dashboard UI 802 that may be generated by the local UI program 148 and/or the user web portal program 126. The dashboard UI 802 includes a plurality of virtual controls (e.g., selectable buttons) that may be selected by a user to access additional user interfaces for managing the traffic shaping. In this example, the dashboard UI 802 includes virtual controls for a dropdown menu 804, flow performance information 806, new device information 808, a latency chart 810, a usage bar graph 812, a usage pie chart 814, a "my devices" interface 816, and real time information 818. Further, the dashboard UI 802 includes a scrollable listing 820 of events, such as bandwidth saturation events, notifications of new devices being added to the user's network, latency information, network performance information, and the like.

The dashboard 802 may be used to control settings of the traffic shaping, view various metrics, view devices able to use the network, and the like. The dropdown menu 806 may provide a menu of system management options. The flow performance 806 may provide a listing detailing the performance of various traffic flows in the user's network. The new devices 808 may provide a listing of any devices that have been newly detected as being added to the user's network. The latency chart 810 may provide a representation of latency information for the user's network. The usage bar 812 may show the network usage metrics for various traffic flows. The usage pie chart 814 may show the network usage metrics for various traffic flows in a pie chart format. The "my devices" 816 may show the devices able to access the user's network, and the real-time information 818 may show the current network usage information.

In addition, the user may select one of the listed events 820 to be presented with a user interface, such as the user interface illustrated in FIG. 3, to enable management of the event. For example, if the user selects the first listed event 822, which indicates 100% bandwidth saturation, the user may be presented with a user interface such as that illustrated in FIG. 3, which identifies the two main contributors to the bandwidth congestion. The user may be able to select one of the contributors as having priority over the other, and the selection may be applied to the weighting scheme(s) discussed above, e.g., with respect to FIGS. 4-7. Further, while FIGS. 3 and 8 illustrate examples of possible user interfaces for discussion purposes, numerous other user interfaces may be used with the implementations herein, as will be apparent to those of skill in the art having the benefit of the disclosure herein.

Figure 9:
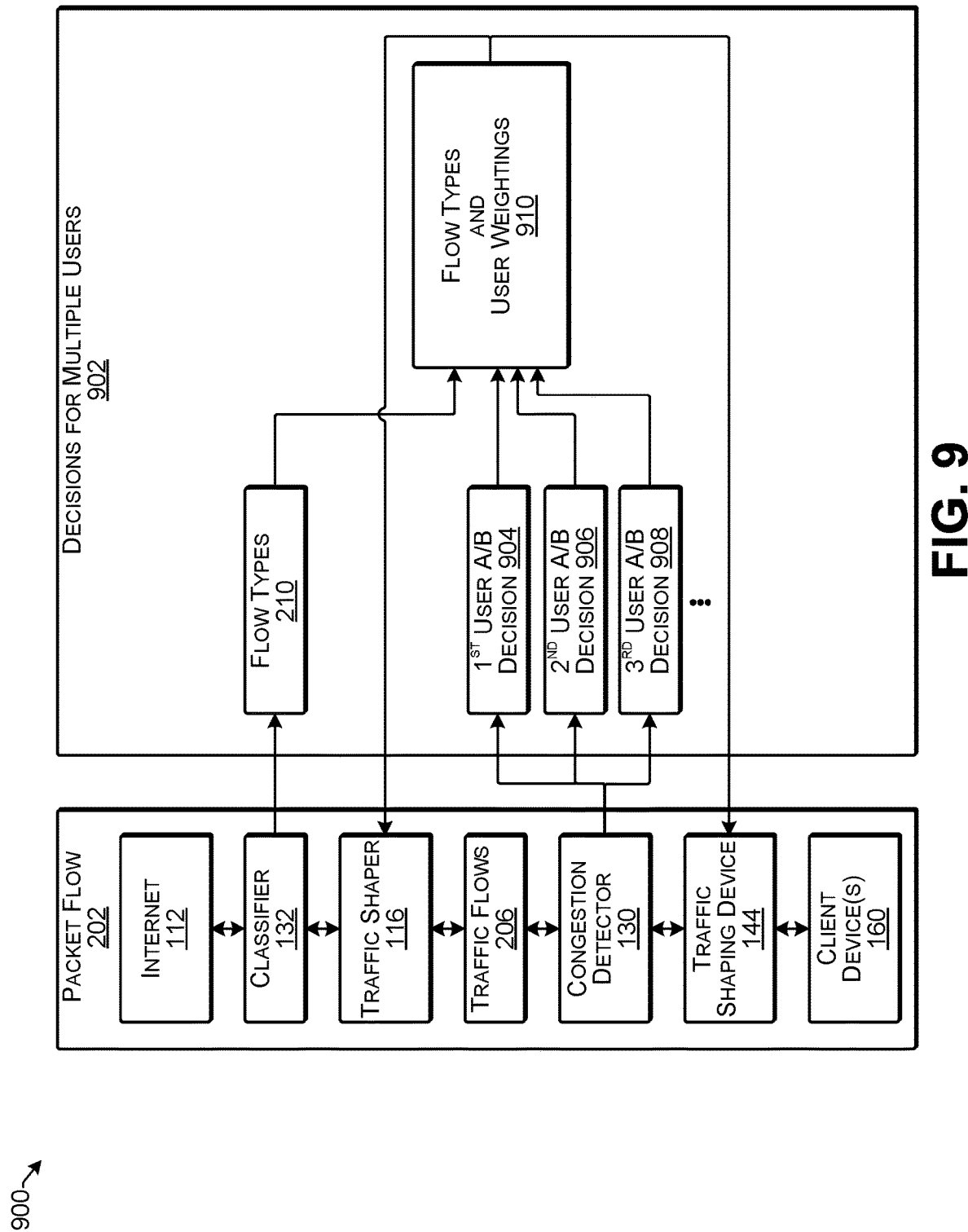
FIG. 9 illustrates an example of a traffic shaping logical configuration according to some implementations.

FIG. 9 illustrates an example of a traffic shaping logical configuration 900 according to some implementations. In this example, multiple users are able to make selections for establishing weightings of traffic flows as shown in a decision flow per user 902. Accordingly, when congestion is detected by the congestion detector 130, the system may present multiple users with, e.g., the user interface discussed above with reference to FIG. 3, and may receive a first user A/B decision 904 from a first user, a second user A/B decision 906 from a second user, a third user A/B decision from a third user, and so forth. The decisions 904-908 of the multiple users may be used to determine flow types and user weightings 910 using any suitable weightings or other ranking techniques for the various identified flow types.

In some examples, the decisions 904-908 of the multiple users may be weighted equally for determining the weightings of the traffic flows. In other examples, one of the user's decisions may carry more weight or may otherwise have a higher priority than the decisions of the other users. For instance, suppose that the first user is an adult and the other two users are children. The first user's decisions 904 may take priority over the second and third users' decisions, while the second user's decision 906 may be equally weighted with the third user's decision 908. Thus, in this case, if the first user submits a decision, the first user's decision may override the decisions of the second or third user. On the other hand, if the first user does not submit a decision, the second and/or third users' decisions may be applied.

Figure 10:
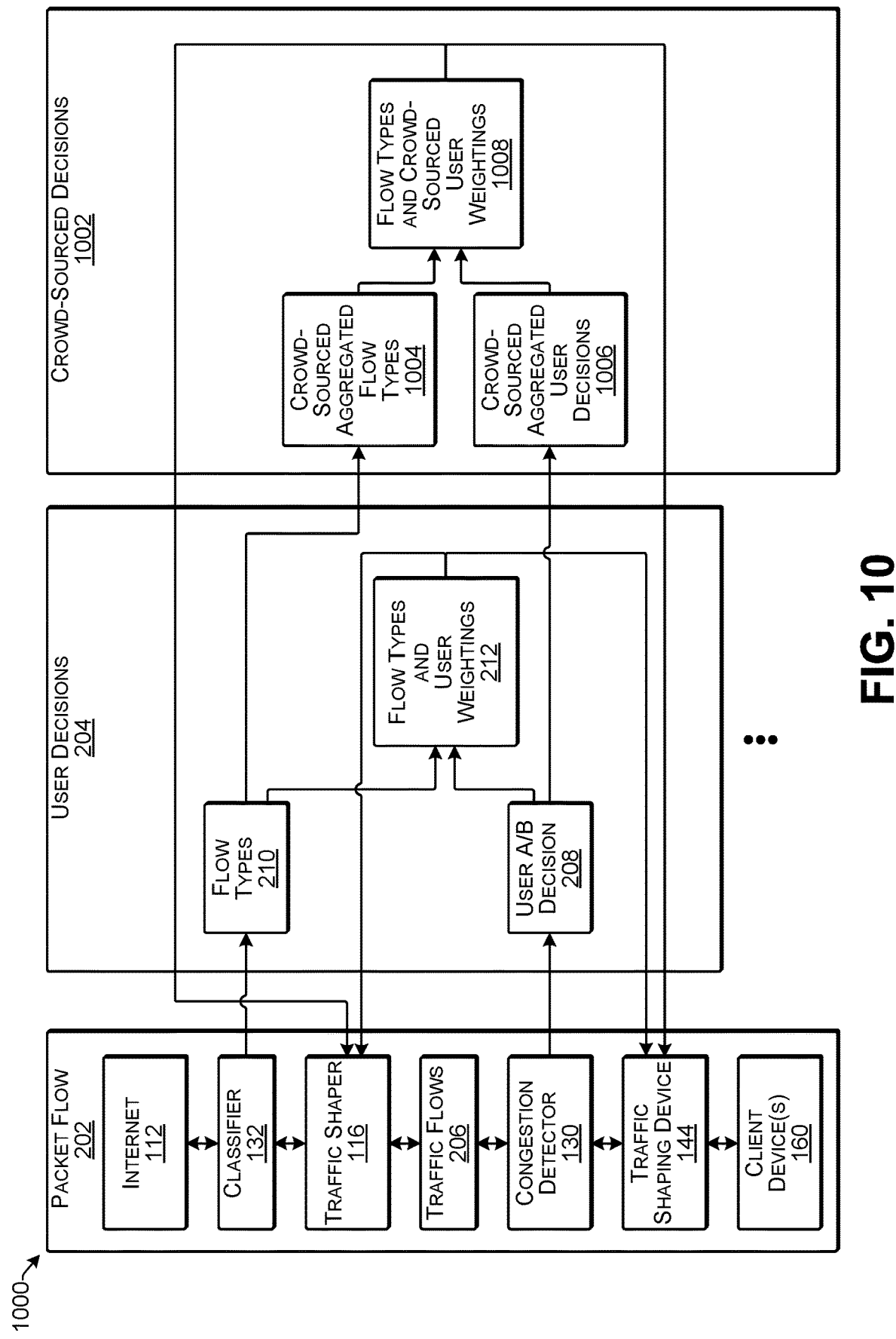
FIG. 10 illustrates an example of a traffic shaping logical configuration according to some implementations.

FIG. 10 illustrates an example of a traffic shaping logical configuration 1000 according to some implementations. In this example, the service computing device (not shown in FIG. 10) may receive and aggregate the flow type decision data from a plurality of different user locations as crowd-sourced decisions 1002. The crowd sourced decisions 1002 may be used to create crowd-sourced user weightings that may be used as a default ordering of a plurality of known flow types. In this example, for a plurality of different users and user locations, the decisions 208 made by each individual user and the corresponding flow types 210 may be forwarded to a central repository, such as one or more of the service computing devices 102 discussed above with respect to FIG. 1, which may be one or more of the service computing devices that also perform traffic shaping, or one or more separate service computing devices specifically configured to receive and process crowd-sourced information.

The service computing device may receive crowd-sourced aggregated flow types 1004 and corresponding crowd-sourced aggregated user decisions 1006. Based on the crowd-sourced aggregated flow types 1004 and the corresponding crowd-sourced aggregated user decisions 1006, the service computing device may determine flow types and corresponding crowd-sourced user weightings 1008, which may be included in the traffic shaping model 142 discussed above with respect to FIG. 1. As discussed above, the model may initially include a plurality of default weights corresponding to a default ordering of the known flow types. As user decisions are received at a particular user location, the weightings in the traffic shaping model are updated to reflect the preferences of the particular user, which may override and replace the default weightings in the traffic shaping model. Accordingly, in the most simple case, the traffic shaper would use the crowd-sourced weightings until a corresponding user-provided decision is received from the user at the user location. As more and more user decisions are received, the weightings based on the local user's decisions may replace the crowd-sourced weightings in the traffic shaping model.

Figure 11:
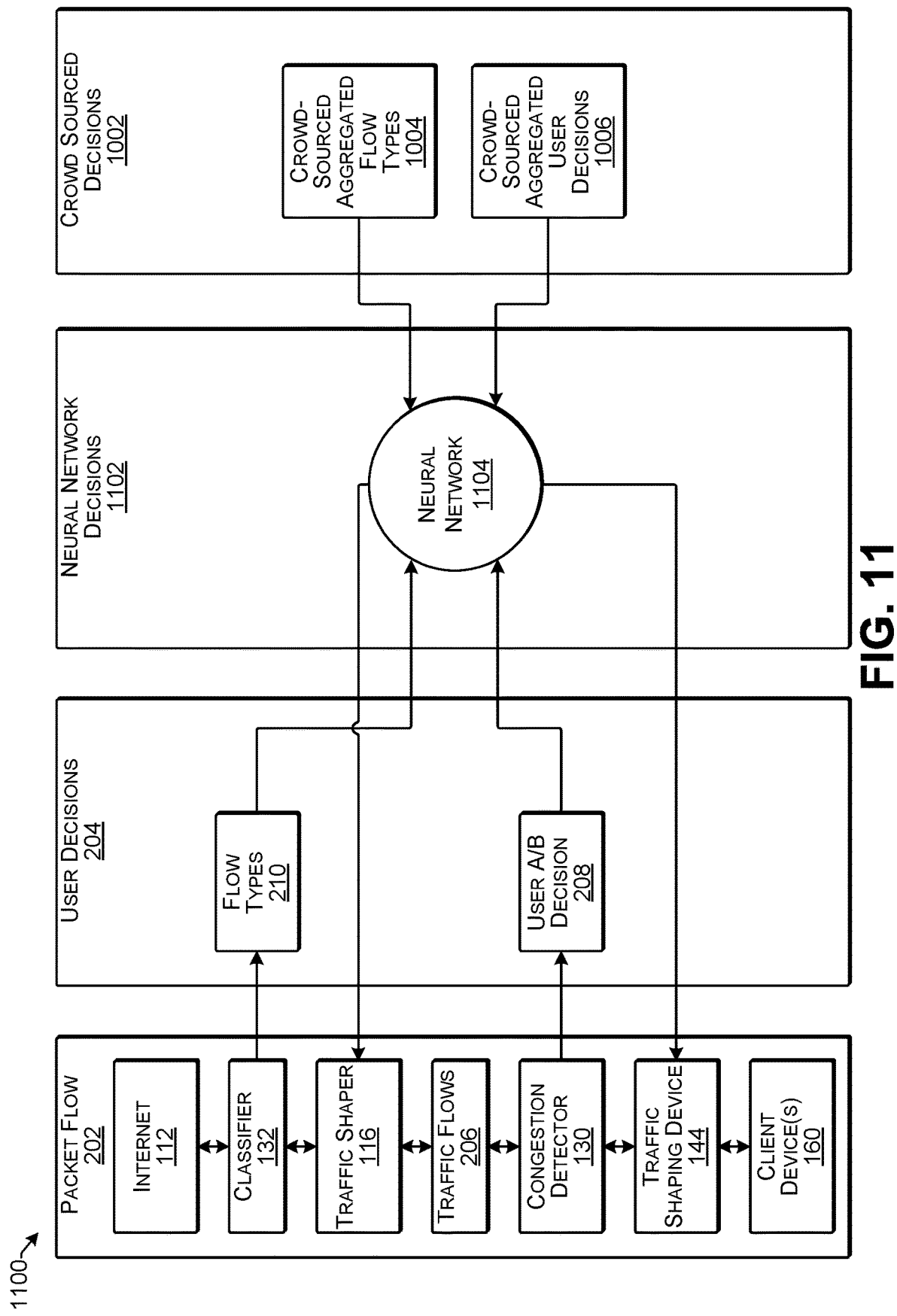
FIG. 11 illustrates an example of a traffic shaping logical configuration according to some implementations.

FIG. 11 illustrates an example of a traffic shaping logical configuration 1100 according to some implementations. In this example, the crowd-sourced example discussed with respect to FIG. 10 may be replaced or supplemented by neural network decisions 1102. For example, a neural network 1104 or other computational model may receive the flow types 210 and user decisions 208 from an individual user and may also receive crowd-sourced aggregated user decisions 1006 and corresponding crowd-sourced aggregated flow types 1004. The neural network may operate to increase the number of situations in which the system itself identifies which flows to which to give priority. In some cases, at least a portion of the crowd-sourced aggregated user decisions 1006 may be used as training data to train the neural network 1104.

Examples of the neural network 1104 may include artificial neural networks, such as recurrent neural networks, long short term memory (LSTM) neural networks, or the like. Examples of other types of computational models that may be used in some implementations herein may include predictive models, decision trees, classifiers, regression models, such as linear regression models, support vector machines, and stochastic models, such as Markov models and hidden Markov models, and so forth. The neural network 1104 (or other computational model) may be periodically updated and re-trained based on new training data to keep the neural network 1104 up to date.

After the neural network (or other computational model) 1104 has been trained, the neural network (or other computational model) may be included in the traffic shaping model 142 discussed above with respect to FIG. 1 (not shown in FIG. 11). Thus, as the neural network 1104 receives information from the classifier 132 regarding the flow types causing congestion, the neural network may apply any received user A/B decisions for determining which flow type to prioritize over the other. As the neural network receives additional user decisions 208, the neural network may continually update itself. Accordingly, the traffic shaping model 142 including the neural network 1104 may determine weightings dynamically based on input from the user and the crowd-sourced user decisions of a plurality of users. Additionally, the neural network 1104 may apply weights based on the sources of decisions, e.g., user sourced-decisions may be weighted greater than crowd-sourced decisions, and crowd-sourced decisions may be weighted higher than neural net-sourced decisions.

Figure 12:
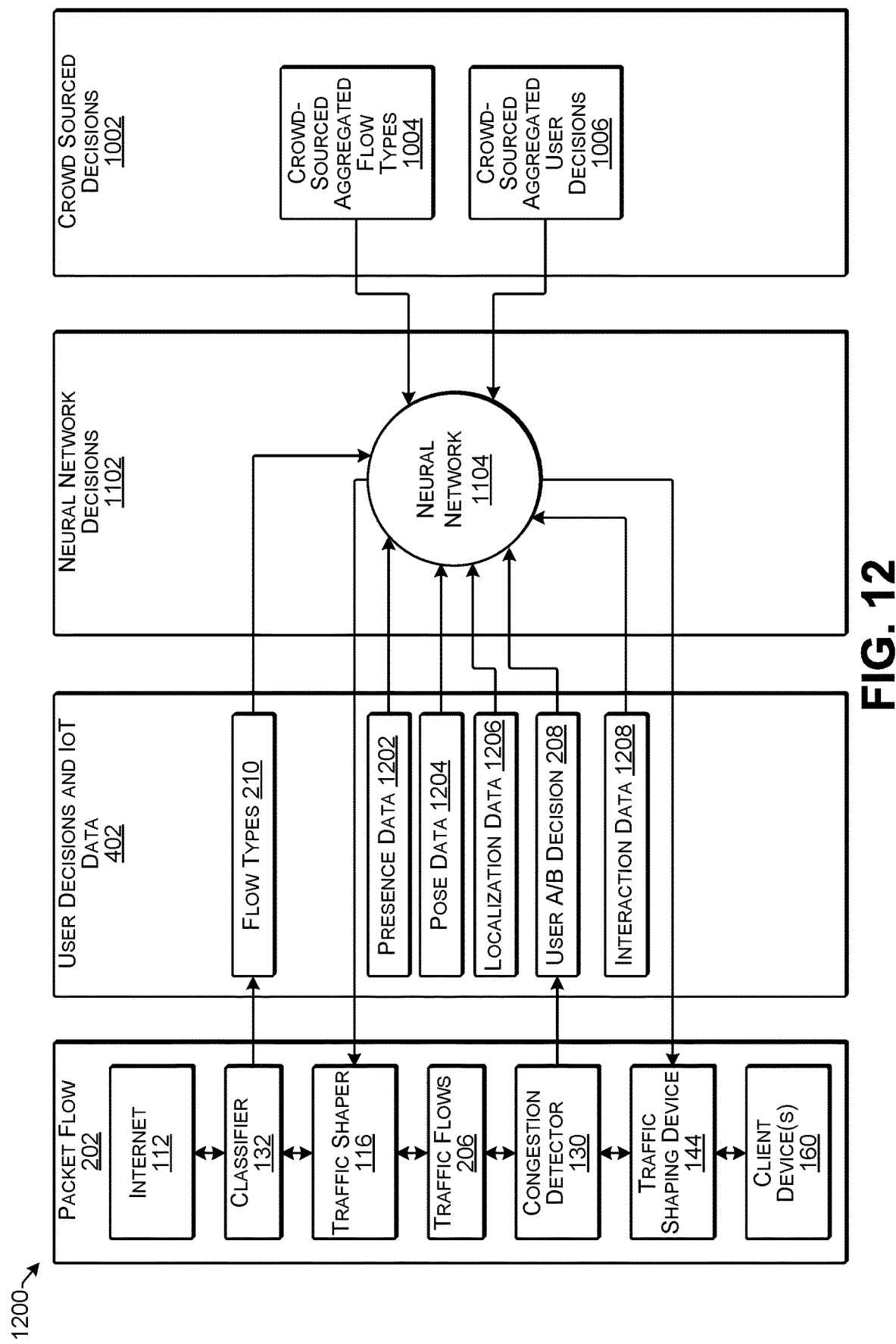
FIG. 12 illustrates an example of a traffic shaping logical configuration according to some implementations.

FIG. 12 illustrates an example of a traffic shaping logical configuration 1200 according to some implementations. In this example, the neural network 1104 included in the traffic shaping model 142 of FIG. 1 (not shown in FIG. 12), may receive additional data inputs in addition to the user A/B decisions and flow types 210. For example, the neural network 1104 may receive presence data 1202, pose data 1204, localization data 1206, and interaction data 1208. The additional data inputs may be received from various IoT devices, such as cameras, infrared sensors and other motion sensors, proximity sensors, smart phones, wearable devices, and so forth as enumerated additionally elsewhere herein.

The neural network may dynamically adjust the weights of various traffic flows based on the additional data inputs. For example, based on knowing where the user is located within the user location may provide an indication as to the weighting for particular traffic flows without requesting input from the user. As one example, presence data 1202 and localization data 1206 may include determining a user's location via camera, motion sensor, geolocation data from a smart phone, or the like, and may indicate if the user is in a location for using a particular traffic flow. For instance, if no users are determined to be in a room with the main TV, the priority of the data travelling to the TV may be dynamically lowered until someone enters the room. As another example, a washing machine in the laundry room, may be given very low priority, but if a user enters the laundry room the priority applied to the devices present in the room may be increased.

Thus, localization data 1206 and presence data 1202 may allow the traffic shaping model to dynamically adjust weightings of various traffic flows based on a likelihood that the user is currently using a first traffic flow and not using a second traffic flow. Thus, the input data may be used to determine the traffic shaping priorities automatically without asking the user.

As another example, pose data 1204 may be considered with respect to the user and/or a device. As one example, if the user is facing away from a device that is streaming video, the priority may be lowered, and if the user faces toward the device, the priority may be increased. Similarly, if a device playing video is placed with its display face down on a surface, the priority may be lowered and if lifted off the surface and turned face up, the priority may be increased.

As still another example, interaction data 1208 may be sent to the traffic shaping model to indicate that the user is currently interacting with a particular device. When this interaction is identified, the weighting for a traffic flow associated with the particular device may be increased until the interaction data 1208 indicates that the user is no longer interacting with the particular device. Accordingly, implementations herein are able to determine weightings dynamically based on decisions rendered by the neural network 1104 based on input data received from IoT devices, the user decisions, and the crowd-sourced user decisions of a plurality of users.

Figure 13:
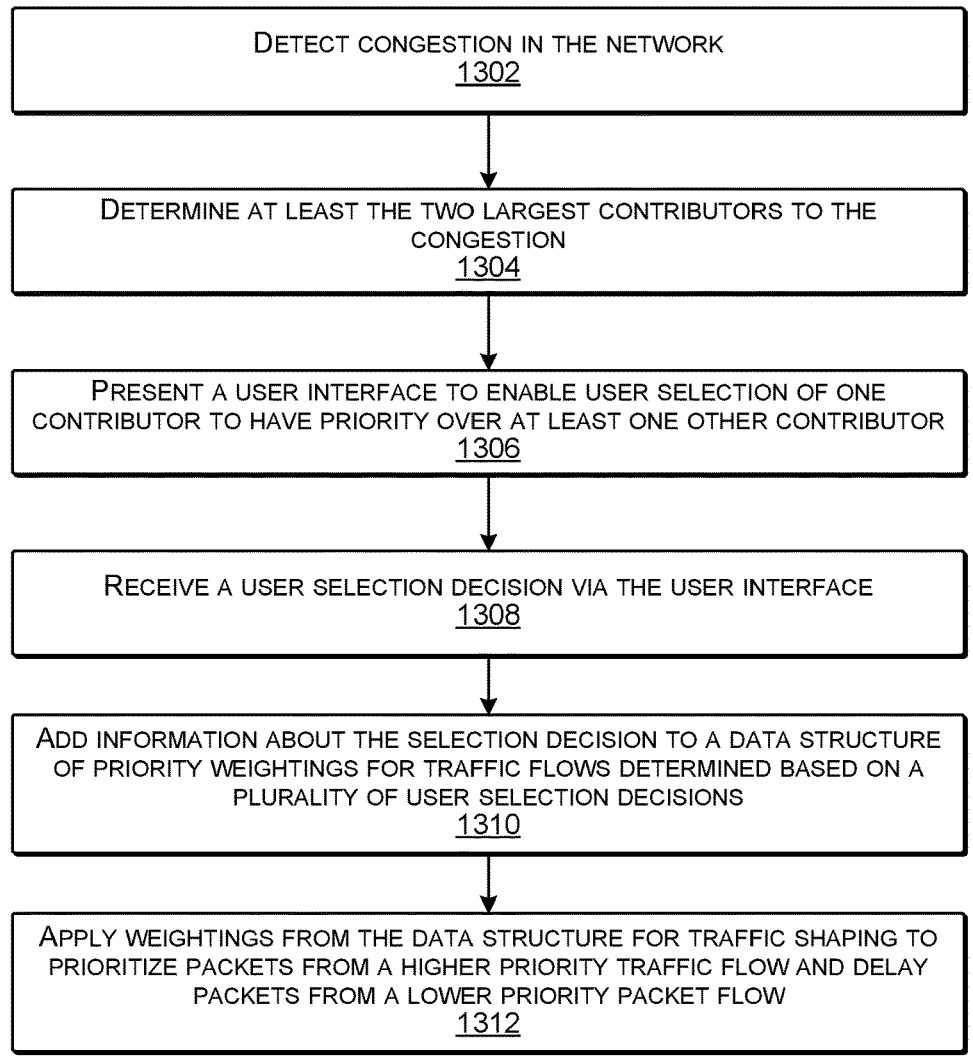
FIG. 13 is a flow diagram illustrating an example process for traffic shaping according to some implementations.
Figure 14:
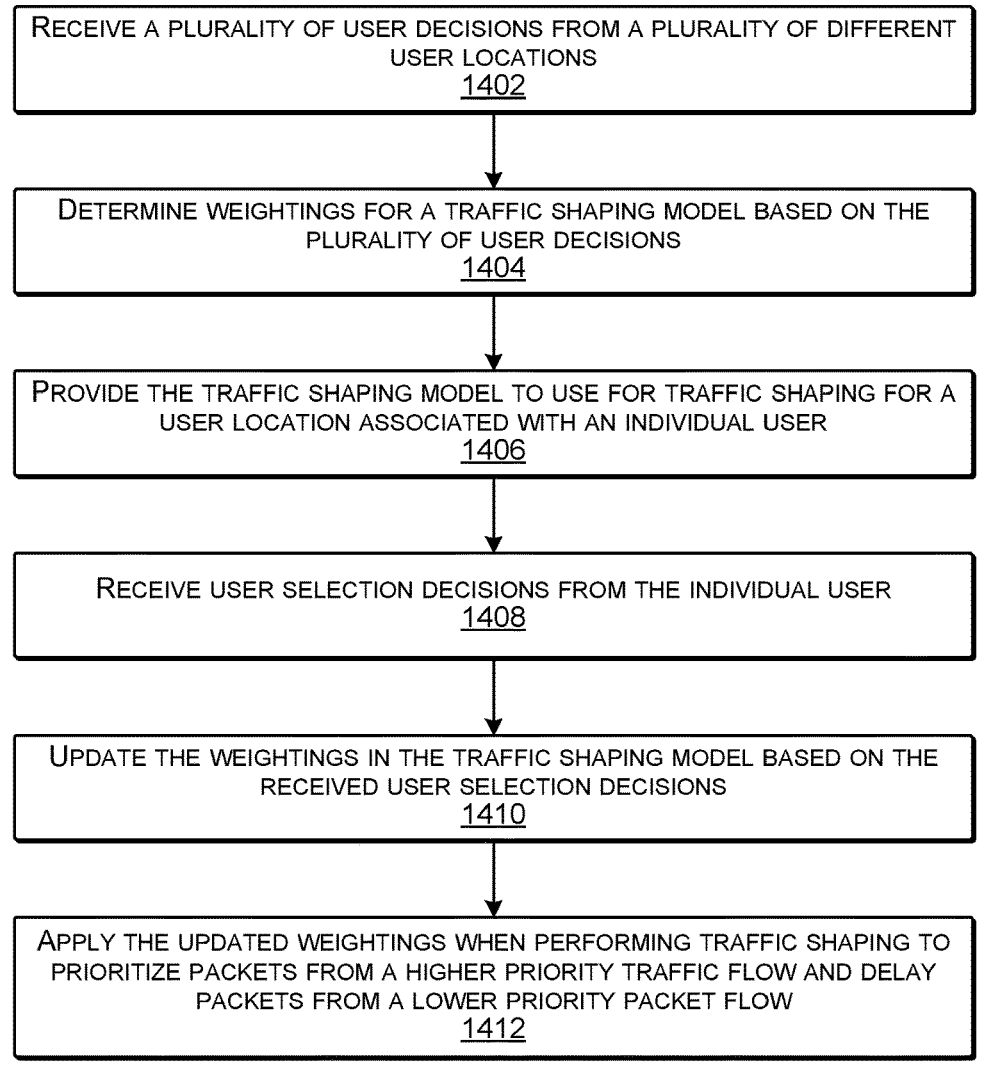
FIG. 14 is a flow diagram illustrating an example process for traffic shaping according to some implementations.
Figure 15:
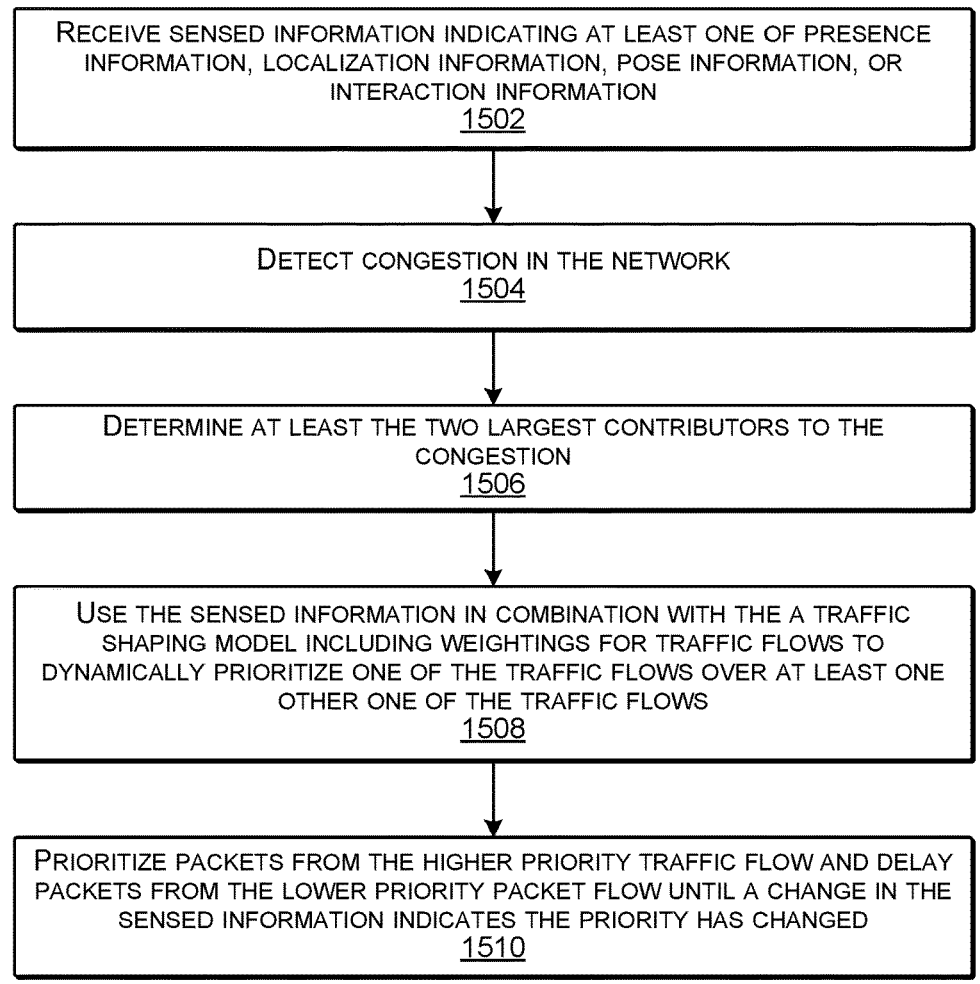
FIG. 15 is a flow diagram illustrating an example process for traffic shaping according to some implementations.

FIGS. 13-15 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

FIG. 13 is a flow diagram illustrating an example process 1300 according to some implementations. In some examples, the process 1300 may be executed by the service computing device 102, the traffic shaping device 144, or other suitable computing device.

At 1302, the computing device may detect congestion in the network. For example, the service computing device and/or the traffic shaping device may detect that the network is congested using the techniques discussed above or other techniques for determining network bandwidth usage.

At 1304, the computing device may determine at least the two largest contributors to the congestion. The service computing device and/or the traffic shaping device may determine which of the traffic flows are the primary contributors to the congestion, such as based on the number of packets being transferred, or the like, and may further determine the source of the traffic flow and the destination of the traffic flow for identifying each of the traffic flows to the user.

At 1306, the computing device may present a user interface to enable selection of one contributor to have priority over at least one other contributor. For example, a user interface program, web portal, or the like, may present a user interface to the user on a display of a client device, such as a computer, tablet computing device, smart phone, television, or other client device having a display. The user interface may include information related to a first traffic flow and a second traffic flow determined to be main contributors to the congestion, and the service computing device and/or the traffic shaping device may receive, via the user interface, a selection of one of the first traffic flow or the second traffic flow as an indication of the user selection of the selected traffic flow as having a higher priority than at the least one other traffic flow. An example selection user interface is discussed above with respect to FIG. 3.

At 1308, the computing device may receive a user selection decision via the user interface. The user may select one of the traffic flows as having priority over at least one other traffic flow.

At 1310, the computing device may add information about the selection decision to a data structure of priority weightings for traffic flows determined based on a plurality of user selection decisions. Examples of data structures are discussed above with respect to FIGS. 4-7.

At 1312, the computing device may apply information from the data structure for performing traffic shaping to prioritize packets from a higher priority traffic flow and delaying packets from a lower priority packet flow. For example, the service computing device or the traffic shaping device may send packets of the selected traffic flow according to the higher priority and send packets of the at least one other traffic flow according to a lower priority. The packets of the selected traffic flow may be sent to a destination device using a tunneling communication service, while at least some of the packets of the at least one other traffic flow are delayed to reduce the congestion in the network.

FIG. 14 is a flow diagram illustrating an example process 1400 according to some implementations. In some examples, the process 1400 may be executed by the service computing device 102 or other suitable computing device. In some cases, the process 1400 may combined with the process 1300 discussed above.

At 1402, the computing device may receive a plurality of user decisions from a plurality of different user locations. For example, the user decisions may be sent by the user interface to a computing device that receives user decisions made by a plurality of different users at a plurality of different user locations.

At 1404, the computing device may determine weightings for a traffic shaping model based on the plurality of user decisions. The computing device may determine the most popular selections of the plurality of users for establishing a ranking of known traffic flows with respect to each other. In some examples, weightings may be assigned to each known traffic flow based on the rankings.

At 1406, the computing device may provide the traffic shaping model to use for traffic shaping for a user location of an individual user. For example, the weightings from the aggregated selection decisions may be included in the traffic shaping model.

At 1408, the computing device may receive user selection decisions from the individual user. For example, the service computing device or the traffic shaping device may receive the user selection decision via the selection user interface, or the like.

At 1410, the computing device may update the weightings in the traffic shaping model based on the received user selection decisions. For example, weightings indicated by the user may be included in the traffic shaping model that also includes the aggregated weightings. Thus, the traffic shaping model may include one or more priority weightings indicated by the user and one or more priority weightings determined from the aggregated priority selection decisions received from the plurality of different users associated with the plurality of different respective user locations.

At 1412, the computing device may apply the updated weightings when performing traffic shaping to prioritize packets from a higher priority traffic flow and delay packets from a lower priority packet flow. In some examples, blocks 1408-1412 may be executed by the traffic shaping device at the user location or by the service computing device.

FIG. 15 is a flow diagram illustrating an example process 1500 according to some implementations. In some examples, the process 1500 may be executed by the service computing device 102, the traffic shaping device 144, or other suitable computing device.

At 1502, the computing device may receive sensed information indicating at least one of presence information, localization information, pose information, or interaction information. As discussed above, the sensed information may be received from any of various IoT devices, such as cameras, proximity sensors, motion sensors, geolocation devices, or the like. The sensed information may be received at the service computing device and/or the traffic shaping device.

At 1504, the computing device may detect congestion in the network. For example, the service computing device and/or the traffic shaping device may detect that the network is congested using the techniques discussed above or other techniques for determining network bandwidth usage.

At 1506, the computing device may determine at least the two largest contributors to the congestion. The service computing device and/or the traffic shaping device may determine which of the traffic flows are the primary contributors to the congestion, such as based on the number of packets being transferred, or the like, and may further determine the source of the traffic flow and the destination of the traffic flow for identifying each of the traffic flows to the user.

At 1508, the computing device may use the sensed information in combination with the traffic shaping model including weightings for traffic flows to dynamically prioritize one of the traffic flows over another. In some cases, the traffic shaping model may include a trained computational model, such as a neural network or statistical model that determines a weighting for the traffic flows based on the sensed information.

At 1510, the computing device may prioritize packets from the higher priority traffic flow and may delay packets from the lower priority packet flow until a change in the sensed information indicates the priority has changed. For example, if the sensed information indicates that a user enters a room that was previously unoccupied, the priority to a device in the room may be increased. Similarly, if a user begins interacting with a device, priority of a traffic flow to that device may be increased.

Figure 16:
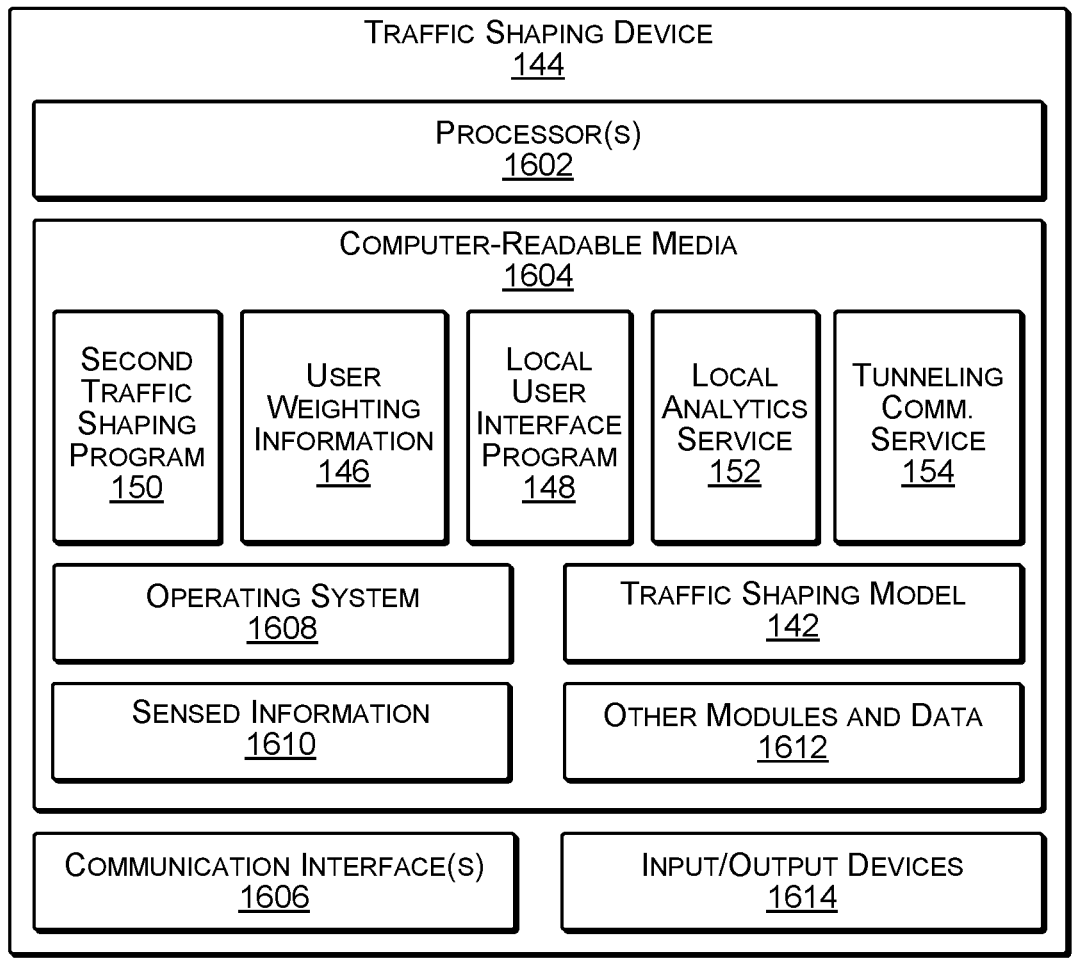
FIG. 16 illustrates an example traffic shaping device according to some implementations.

FIG. 16 illustrates an example traffic shaping device 144 according to some implementations. In some examples, the traffic shaping device 144 may be a computing device, such as a specialized device for performing traffic shaping, while in other examples, the traffic shaping device may be integrated into a wireless router and/or modem, a cable box, or the like, or any other computing device configured to perform the functions described herein. Thus, other architectures may additionally or alternatively be used. In the illustrated example, the traffic shaping device 144 includes, or may have associated therewith, one or more processors 1602, one or more communication interfaces 1606, and one or more computer-readable media 1604.

Each processor 1602 may be a single processing unit or a number of processing units, and may include single or multiple computing units, or multiple processing cores. The processor(s) 1602 can be implemented as one or more central processing units, microprocessors, microcomputers, microcontrollers, digital signal processors, state machines, logic circuitries, and/or any devices that manipulate signals based on operational instructions. For instance, the processor(s) 1602 may be one or more hardware processors and/or logic circuits of any suitable type specifically programmed or configured to execute the algorithms and processes described herein. The processor(s) 1602 can be configured to fetch and execute computer-readable instructions stored in the computer-readable media 1604, which can program the processor(s) 1602 to perform the functions described herein.

The computer-readable media 1604 may include volatile and nonvolatile memory and/or removable and non-removable media implemented in any type of technology for storage of information such as computer-readable instructions, data structures, program modules, or other data. For example, the computer-readable media 1604 may include, but is not limited to, RAM, ROM, EEPROM, flash memory or other memory technology, optical storage, solid state storage, magnetic tape, magnetic disk storage, cloud storage, or any other medium that can be used to store the desired information and that may be accessed by a computing device. Depending on the configuration of the traffic shaping device 144, the computer-readable media 1604 may be a tangible non-transitory medium to the extent that, when mentioned, non-transitory computer-readable media exclude media such as energy, carrier signals, electromagnetic waves, and/or signals per se. In some cases, the computer-readable media 1604 may be at the same location as the traffic shaping device 144, while in other examples, the computer-readable media 1604 may be partially remote from the traffic shaping device 144.

The computer-readable media 1604 may be used to store any number of functional components that are executable by the processor(s) 1602. In many implementations, these functional components comprise instructions or programs that are executable by the processor(s) 1602 and that, when executed, specifically program the processor(s) 1602 to perform the actions attributed herein to the traffic shaping device 144. Functional components stored in the computer-readable media 1604 may include the second traffic shaping program 150, the local user interface program 148, the local analytics service 152, and the tunneling communication service 154. Each of these functional components may include one or more computer programs, computer-readable instructions, executable code, or portions thereof that are executable to cause the processor(s) 1602 to perform various tasks, such as for receiving and processing data sent by the service computing device 102 and/or the one or more client devices 160. Additionally, an operating system 1608 may control and manage various functions of the traffic shaping device 144. In some cases, the functional components may be stored in a storage portion of the computer-readable media 1604, loaded into a local memory portion of the computer-readable media 1604, and executed by the one or more processors 1602. Numerous other software and/or hardware configurations will be apparent to those of skill in the art having the benefit of the disclosure herein.

In addition, the computer-readable media 1604 may store data and data structures used for performing the functions and services described herein. For example, the computer-readable media 1604 may store user weighting information 146, such as in one or more data structures as discussed above, the traffic shaping model 142, and sensed information 1610, such as presence information, localization information, pose information, device interaction information, or the like. The traffic shaping device 144 may also include or maintain other modules and data 1612, which may include programs, drivers, etc., and other data used or generated by the functional components. Further, the traffic shaping device 144 may include many other logical, programmatic, and physical components, of which those described above are merely examples that are related to the discussion herein.

The communication interface(s) 1606 may include one or more interfaces and hardware components for enabling communication with various other devices, such as over the one or more networks 106. Thus, the communication interfaces 1606 may include, or may couple to, one or more ports that provide connection to the network(s) 106 for communicating with the service computing device 102 or other computing devices. In some examples, the communication interfaces 1606 may include the gateway 110, while in other examples, the gateway 110 may be a separate device. Further, in some examples, the communication interfaces 1606 may include the access point 164 or other interfaces for communicating with the client devices 160 and/or the sensors 166. For example, the communication interface(s) 1606 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel), direct connections, as well as close-range communications such as BLUETOOTH®, and the like, as additionally enumerated elsewhere herein.

In addition, the traffic shaping device 144 may include one or more input/output (I/O) devices 1614. Such I/O devices 1620 may include a display, speakers, a microphone, and various user controls (e.g., buttons, a joystick, a mouse, a keyboard, a keypad, a touch screen, etc.), and so forth.

Figure 17:
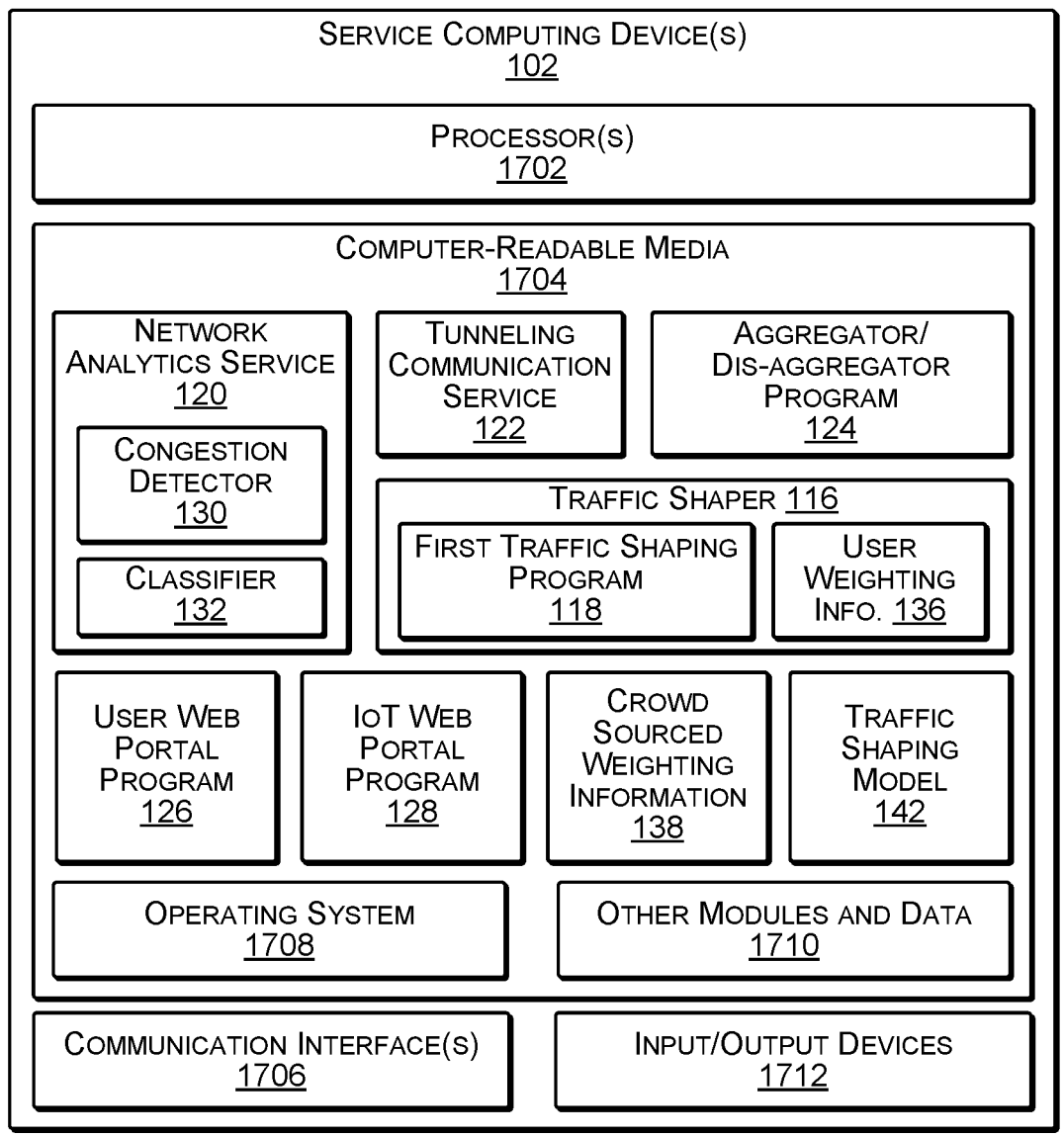
FIG. 17 illustrates an example service computing device according to some implementations.

FIG. 17 illustrates an example service computing device 102 according to some implementations. In some examples, each service computing device 102 may include one or more servers, personal computers, or other types of computing devices that may be embodied in any number of ways. For instance, in the case of a server, the programs, other functional components, and at least a portion of data storage may be implemented on at least one server, such as in a cluster of servers, a server farm, a data center, a cloud-hosted computing service, and so forth, although other computer architectures may additionally or alternatively be used. Further, while the functional components and data are shown as being co-located in this example for convenience of discussion, in other examples, the functional components and data may be distributed across a plurality of service computing devices at the same location or at a plurality of different locations in any desired manner In the illustrated example, the service computing device 102 includes, or may have associated therewith, one or more processors 1702, one or more communication interfaces 1706, and one or more computer-readable media 1704.

Each processor 1702 may be a single processing unit or a number of processing units, and may include single or multiple computing units, or multiple processing cores. The processor(s) 1702 can be implemented as one or more central processing units, microprocessors, microcomputers, microcontrollers, digital signal processors, state machines, logic circuitries, and/or any devices that manipulate signals based on operational instructions. For instance, the processor(s) 1702 may be one or more hardware processors and/or logic circuits of any suitable type specifically programmed or configured to execute the algorithms and processes described herein. The processor(s) 1702 can be configured to fetch and execute computer-readable instructions stored in the computer-readable media 1704, which can program the processor(s) 1702 to perform the functions described herein.

The computer-readable media 1704 may include volatile and nonvolatile memory and/or removable and non-removable media implemented in any type of technology for storage of information such as computer-readable instructions, data structures, program modules, or other data. For example, the computer-readable media 1704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that may be accessed by a computing device. Depending on the configuration of the service computing device 102, the computer-readable media 1704 may be a tangible non-transitory medium to the extent that, when mentioned, non-transitory computer-readable media exclude media such as energy, carrier signals, electromagnetic waves, and/or signals per se. In some cases, the computer-readable media 1704 may be at the same location as the service computing device 102, while in other examples, the computer-readable media 1704 may be partially remote from the service computing device 102.

The computer-readable media 1704 may be used to store any number of functional components that are executable by the processor(s) 1702. In many implementations, these functional components comprise instructions or programs that are executable by the processor(s) 1702 and that, when executed, specifically program the processor(s) 1702 to perform the actions attributed herein to the service computing device 102. Functional components stored in the computer-readable media 1704 may include the first traffic shaping program 118, the aggregator/dis-aggregator program 124, the network analytics service 120, including the classifier 132 and the congestion detector 130, the tunneling communication service 122, the user web portal program 126, and the IoT web portal program 128. Each of these functional components may include one or more computer programs, computer-readable instructions, executable code, or portions thereof that are executable to cause the processor(s) 1702 to perform various tasks, such as for receiving and processing data sent by the gateway computing device 104. Additionally, an operating system 1708 may control and manage various functions of the service computing device 102. In some cases, the functional components may be stored in a storage portion of the computer-readable media 1704, loaded into a local memory portion of the computer-readable media 1704, and executed by the one or more processors 1702. Numerous other software and/or hardware configurations will be apparent to those of skill in the art having the benefit of the disclosure herein.

In addition, the computer-readable media 1704 may store data and data structures used for performing the functions and services described herein. For example, the computer-readable media 1704 may user weighting information 136, crowd-sourced weighting information 138, and the traffic shaping model 142. In some examples, the traffic shaping model 142 may include a trained computational model, such as a neural network, or the like. In other examples, the traffic shaping model 142 may include one or more data structures of weightings based on user selections and/or crowd-sourced selections of traffic flows, along with one or more rules for applying traffic shaping priority based on the weightings. The service computing device 102 may also include or maintain other modules and data 1710, which may include programs, drivers, etc., and other data used or generated by the functional components. Further, the service computing device 102 may include many other logical, programmatic, and physical components, of which those described above are merely examples that are related to the discussion herein.

The communication interface(s) 1706 may include one or more interfaces and hardware components for enabling communication with various other devices, such as over the one or more networks 106. Thus, the communication interfaces 1706 may include, or may couple to, one or more ports that provide connection to the network(s) 106 for communicating with the gateway 110 and the internet 112 (not shown in FIG. 17). For example, the communication interface(s) 1706 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel), direct connections, as well as close-range communications such as BLUETOOTH®, and the like, as additionally enumerated elsewhere herein.

In addition, the service computing device 102 may include one or more input/output (I/O) devices 1712. Such I/O devices 1712 may include a display, speakers, a microphone, and various user controls (e.g., buttons, a joystick, a mouse, a keyboard, a keypad, a touch screen, etc.), and so forth. Further, the one or more client devices 160 may have hardware configurations similar to the traffic shaping device 144 and/or the service computing device 102, but with different functional components.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors; and
one or more non-transitory computer-readable media maintaining executable instructions, which, when executed by the one or more processors, program the one or more processors to perform operations comprising:
detecting, by the one or more processors, congestion in network traffic in a virtual private network (VPN), the network traffic including a plurality of traffic flows directed over the VPN from a wide area network to a local network gateway at a user location for consumption by one or more users at the user location;
determining at least two traffic flows contributing to the congestion in the network traffic directed over the VPN to the local network gateway;
providing a user interface to present on a device at the user location, the user interface including information related to a first traffic flow and a second traffic flow determined to be main contributors to the congestion from among the at least two traffic flows contributing to the congestion;
receiving, by the one or more processors, based on a communication received over the VPN from the device at the user location based on a user input received via the user interface, a selection of one of the first traffic flow or the second traffic flow as an indication of a user selection of one of the traffic flows as having a higher priority than at least another one of the traffic flows;
storing the user selection received over the VPN in a first data structure identifying a plurality of traffic flows to the local network gateway, the first data structure including a ranking of at least the first traffic flow and the second traffic flow according to priority based at least on the user selection; and
based on the ranking in the first data structure, sending packets of the selected traffic flow over the VPN to the local network gateway according to the higher priority and sending packets of the at least one other traffic flow over the VPN to the local network gateway according to a lower priority.

2. The system as recited in claim 1, wherein the sending the packets of the selected traffic flow according to the higher priority comprises sending the packets of the selected traffic flow to the local network gateway using a tunneling communication service for providing the VPN.

3. The system as recited in claim 2, wherein the sending the packets of the selected traffic flow according to the higher priority further comprises delaying at least some of the packets of the at least one other traffic flow to reduce the congestion in the VPN.

4. The system as recited in claim 1, the operations further comprising:
adding the indication of the user selection as a priority weighting to the first data structure that includes a plurality of priority weightings of the plurality of traffic flows ranked with respect to each other; and
using the ranking of the plurality of priority weightings for prioritizing packets of higher ranked traffic flows over packets of at least one lower ranked traffic flow to reduce congestion currently detected in the VPN.

5. The system as recited in claim 1, wherein at least some individual traffic flows of the plurality of traffic flows correspond to usage of respective different types of electronic devices on the local network at the user location.

6. The system as recited in claim 5, the operations further comprising including information from the first data structure in a traffic shaping model that includes one or more priority weightings indicated by the user and one or more priority weightings determined from aggregated priority selection decisions received from a plurality of different users associated with a plurality of different respective user locations.

7. The system as recited in claim 1, the operations further comprising:
receiving an indication of a plurality of user selections made by a plurality of different users of the local network, respectively, the plurality of different users associated with respective devices receiving respective ones of the traffic flows over the local network for consumption at the user location;
determining that a first user of the plurality of different users of the local network at the user location has priority over other users of the plurality of different users; and
weighting the user selection of the first user of the local network higher than the user selections of the other users of the local network when ranking the traffic flows in the data structure according to priority.

8. The system as recited in claim 1, the operations further comprising:
executing a neural network configured to receive the indication of the user selection and determine priority weightings of the selected traffic flow and the at least one other traffic flow; and
determining, at least partially based on the priority weightings, to send the packets of the selected traffic flow according to the higher priority and send packets of the at least one other traffic flow according to a lower priority.

9. The system as recited in claim 1, the operations further comprising:
receiving sensed information from a location associated with a first user of the one or more users, the sensed information including at least one of: presence information, localization information, pose information, or device interaction information;
determining priority weightings of the selected traffic flow and the at least one other traffic flow based at least in part on the sensed information; and
determining, at least partially based on the priority weightings, to send the packets of the selected traffic flow according to the higher priority and send the packets of the at least one other traffic flow according to the lower priority.

10. The system as recited in claim 1, further comprising a traffic shaping device located at the user location, the traffic shaping device including a traffic shaping device processor configured by executable instructions to communicate through the local network gateway for communicating with the one or more processors over the VPN, and to communicate with an access point for communicating with one or more client devices associated with the user location.

11. The system as recited in claim 10, the operations further comprising:
receiving, by the traffic shaping device processor, the indication of the user selection of the selected traffic flow as having a higher priority than the at least one other traffic flow;
updating a local second data structure of priority weightings maintained by the traffic shaping device processor at the user location; and
sending information related to at least one of the user selection or the updated local data structure to the one or more processors for use, at least partially, for prioritizing traffic flows at the service computing device, the traffic shaping device sending traffic over the VPN to the one or more processors according to a priority based on the priority ranking of the traffic flows in the local second data structure, and the service computing device sending traffic over the VPN to the local network gateway based on the priority ranking of the traffic flows in the first data structure.

12. The system as recited in claim 1, wherein at least one of the one or more processors is included in a service computing device configured to communicate over the VPN with a traffic shaping device at the user location and a client device associated with a user location, the operations further comprising:
establishing communication for a tunneling communication service as the VPN between the service computing device and the traffic shaping device;
receiving by the one or more processors of the service computing device, from the traffic shaping device, a user selection received via the user interface presented on the client device as the indication of the selection of the one of the traffic flows as having the priority over the at least one other traffic flow; and
encrypting the packets of the selected traffic flow for transmission over the tunneling communication service to the local network gateway.

13. The system as recited in claim 12, the operations further comprising sending the packets of the selected traffic flow over the tunneling communication service to the local network gateway associated with the traffic shaping device, wherein the traffic shaping device is configured to receive and decrypt the packets of the selected traffic flow, and provide the packets to a least one of the client device or another client device associated with the user location.

14. A method comprising:
detecting, by one or more processors, congestion in network traffic in a virtual private network (VPN), the network traffic including a plurality of traffic flows directed over the VPN from a wide area network to a local network gateway at a user location for consumption by one or more users at the user location;
determining, by the one or more processors, at least two traffic flows contributing to the congestion in the network traffic directed over the VPN to the local network gateway;
providing a user interface to present on a device at the user location, the user interface including information related to a first traffic flow and a second traffic flow determined to be main contributors to the congestion from among the at least two traffic flows contributing to the congestion;
receiving, by the one or more processors, based on a communication received over the VPN from the device at the user location based on a user input received via the user interface, a selection of one of the first traffic flow or the second traffic flow as an indication of a user selection of one of the traffic flows as having a higher priority than at least another one of the traffic flows;
storing the user selection received over the VPN in a first data structure identifying a plurality of traffic flows to the local network gateway, the first data structure including a ranking of at least the first traffic flow and the second traffic flow according to priority based at least on the user selection; and
based on the ranking in the first data structure, sending, by the one or more processors, packets of the selected traffic flow over the VPN to the local network gateway according to the higher priority and sending packets of the at least one other traffic flow over the VPN to the local network gateway according to a lower priority.

15. The method as recited in claim 14, further comprising including information from the first data structure in a traffic shaping model that includes one or more priority weightings indicated by the user and one or more priority weightings determined from aggregated priority selection decisions received from a plurality of different users associated with a plurality of different respective user locations.

16. The method as recited in claim 14, further comprising:
receiving an indication of a plurality of user selections made by a plurality of different users of the local network, respectively, the plurality of different users associated with respective devices receiving respective ones of the traffic flows over the local network for consumption at the user location;
determining that a first user of the plurality of different users of the local network at the user location has priority over other users of the plurality of different users; and
weighting the user selection of the first user of the local network higher than the user selections of the other users of the local network when ranking the traffic flows in the data structure according to priority.

17. The method as recited in claim 14, further comprising:
executing a neural network configured to receive the indication of the user selection and determine priority weightings of the selected traffic flow and the at least one other traffic flow; and
determining, at least partially based on the priority weightings, to send the packets of the selected traffic flow according to the higher priority and send packets of the at least one other traffic flow according to a lower priority.

18. One or more non-transitory computer-readable media storing instructions that, when executed by one or more processors, program the one or more processors to:
detect congestion in network traffic in a virtual private network (VPN), the network traffic including a plurality of traffic flows directed over the VPN from a wide area network to a local network gateway at a user location for consumption by one or more users at the user location;
determine at least two traffic flows contributing to the congestion in the network traffic directed over the VPN to the local network gateway;

provide a user interface to present on a device at the user location, the user interface including information related to a first traffic flow and a second traffic flow determined to be main contributors to the congestion from among the at least two traffic flows contributing to the congestion;

receive, based on a communication received over the VPN from the device at the user location based on a user input received via the user interface, a selection of one of the first traffic flow or the second traffic flow as an indication of a user selection of one of the traffic flows as having a higher priority than at least another one of the traffic flows;

store the user selection received over the VPN in a first data structure identifying a plurality of traffic flows to the local network gateway, the first data structure including a ranking of at least the first traffic flow and the second traffic flow according to priority based at least on the user selection; and based on the ranking in the first data structure, send packets of the selected traffic flow over the VPN to the local network gateway according to the higher priority and send packets of the at least one other traffic flow over the VPN to the local network gateway according to a lower priority.

19. The one or more non-transitory computer-readable media as recited in claim 18, the operations further comprising include information from the first data structure in a traffic shaping model that includes one or more priority weightings indicated by the user and one or more priority weightings determined from aggregated priority selection decisions received from a plurality of different users associated with a plurality of different respective user locations.

20. The one or more non-transitory computer-readable media as recited in claim 18, the operations further comprising:

receive an indication of a plurality of user selections made by a plurality of different users of the local network, respectively, the plurality of different users associated with respective devices receiving respective ones of the traffic flows over the local network for consumption at the user location;

determine that a first user of the plurality of different users of the local network at the user location has priority over other users of the plurality of different users; and weight the user selection of the first user of the local network higher than the user selections of the other users of the local network when ranking the traffic flows in the data structure according to priority.

\* \* \* \* \*